US007168809B2

(12) United States Patent
Hoshino et al.

(10) Patent No.: US 7,168,809 B2
(45) Date of Patent: Jan. 30, 2007

(54) STEREOSCOPIC DISPLAY APPARATUS

(75) Inventors: Takeshi Hoshino, Kodaira (JP); Rieko Otsuka, Fuchu (JP); Youichi Horii, Mitaka (JP); Yukinobu Maruyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 136 days.

(21) Appl. No.: 11/072,495

(22) Filed: Mar. 7, 2005

(65) Prior Publication Data

US 2006/0055887 A1   Mar. 16, 2006

(30) Foreign Application Priority Data

Sep. 14, 2004   (JP) ............... 2004-267289

(51) Int. Cl.
*G03B 21/28* (2006.01)
*G03B 21/567* (2006.01)

(52) U.S. Cl. .............. 353/7; 353/99; 359/471; 359/475

(58) Field of Classification Search ............ 353/7, 353/10, 99; 359/462, 471, 475, 477, 478, 359/472.4; 349/15
See application file for complete search history.

(56) References Cited

U.S. PATENT DOCUMENTS

| | | | | |
|---|---|---|---|---|
| 5,678,910 A | * | 10/1997 | Martin | 353/7 |
| 5,754,147 A | * | 5/1998 | Tsao et al. | 345/6 |
| 6,183,088 B1 | * | 2/2001 | LoRe et al. | 353/7 |
| 6,302,542 B1 | * | 10/2001 | Tsao | 353/7 |
| 6,554,430 B2 | * | 4/2003 | Dorval et al. | 353/7 |
| 7,059,729 B2 | * | 6/2006 | Hoshino et al. | 353/94 |
| 2003/0086167 A1 | * | 5/2003 | Sonehara | 359/471 |

FOREIGN PATENT DOCUMENTS

| | | |
|---|---|---|
| JP | 2001-103515 | 4/2001 |
| JP | 2002-027504 | 1/2002 |
| JP | 2002-271820 | 9/2002 |

* cited by examiner

*Primary Examiner*—William C. Dowling
(74) *Attorney, Agent, or Firm*—Antonelli, Terry, Stout & Kraus, LLP

(57) ABSTRACT

It is made possible to view a high-resolution clear stereoscopic image from any direction without taking the projection timing of two-dimensional images into consideration. First and second polygonal mirrors each including mirrors arranged in a ring form around a rotation axis of a screen are disposed. An electronic projector is disposed on an extended line of the rotation axis of the screen so as to be opposed to mirror surfaces of the polygonal mirrors. The electronic projector emits concentrically arranged first and second frame image groups each including frame images arranged in a ring form. The first and second frame image groups are reflected respectively by the first and second polygonal mirrors and projected onto the rotating screen. As the screen rotates, each of the first and second image groups is projected onto the screen and displayed in order from frame image to frame image.

8 Claims, 35 Drawing Sheets

FIG. 36A
FIG. 36B
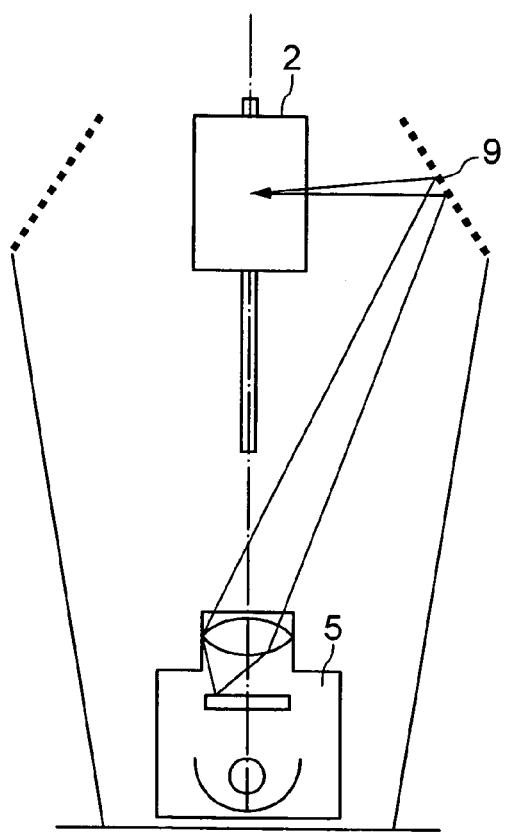
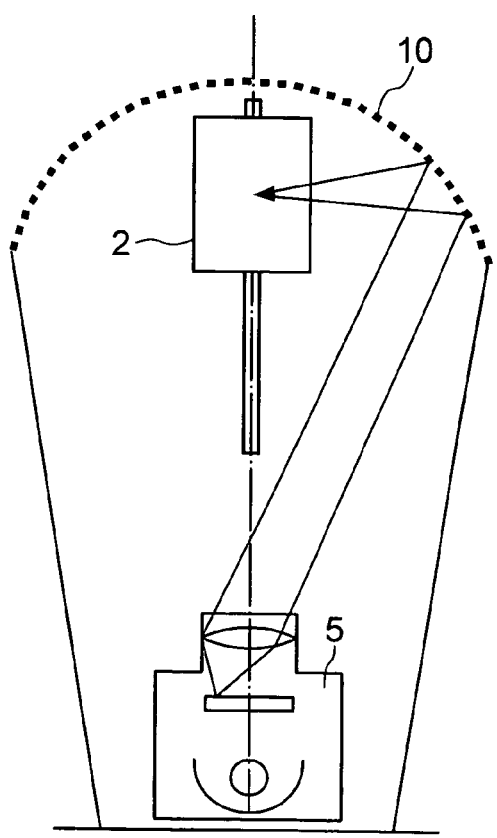

STEREOSCOPIC DISPLAY APPARATUS

INCORPORATION BY REFERENCE

The present application claims priority from Japanese application JP 2004-267289 filed on Sep. 14, 2004, the content of which is hereby incorporated by reference into this application.

BACKGROUND OF THE INVENTION

The present invention relates to a stereoscopic display apparatus which makes it possible for a person to view different aspects of a display subject by watching while moving round a displayed image, i.e., which makes stereoscopic vision possible.

Stereoscopic display apparatuses adapted to display a stereoscopic image by using a rotating screen have been proposed. In an example of them, data of a two-dimensional image of a three-dimensional substance which would be obtained when the substance were viewed from respective directions around it is created on the basis of three-dimensional image data representing the substance, and the two-dimensional images are projected on a rotating screen one after another. (When creating the two-dimensional image data on the basis of the three-dimensional image data, hidden surface removal processing is conducted to remove data corresponding to invisible portions.) As the direction of the screen is changed by the rotation, the two-dimensional image projected onto the screen is successively changed. When viewing this screen from a certain point, the image displayed on the screen is gradually changed by making the rotation of the screen faster. Since the image display is thus conducted, the image projected onto the screen looks like a three-dimensional image as a result of the after image effect of vision (see, for example, JP-A-2001-103515).

According to the technique described in JP-A-2001-103515, the screen is rotated and a two-dimensional image is projected to obtain a three-dimensional image. If illuminance distribution of the projected two-dimensional image is made uniform at this time, illuminance on the image projected onto the screen becomes lower as compared with the rotation axis side of the screen as a distance from the rotation axis becomes greater, and the illuminance distribution becomes nonuniform. In order to prevent this, a technique of making the illuminance distribution of the projected two-dimensional image nonuniform and thereby making the illuminance distribution of the image projected onto the screen is also proposed (see, for example, JP-A-2002-027504).

In a configuration for picking up images of a display subject from different viewpoints, generating respective slide images, and projecting the slide images obtained by picking up from the pertinent viewpoints each time the rotating screen successively faces to directions of these viewpoints, the rotation speed of the screen is increased to approximately 300 to 600 revolutions per minute to induce after images in the naked eyes and form a pseudo three-dimensional image on the screen. Or in a configuration for continuously picking up images of a display subject with a camera which moves around the display subject, thereby generating a cylindrical film of the picked up images, successively reading the images of the cylindrical film, and forming the images in a spatial position via a mirror rotating in synchronism with reading from the cylindrical film, the rotation speed of the mirror is increased sufficiently and consequently a three-dimensional spatial floating image is generated by after images in the naked eyes. Such techniques are also proposed (see, for example, JP-A-2002-271820).

In the techniques described in JP-A-2001-103515 and JP-A-2002-027504, stereoscopic vision is made possible by using after images. Therefore, it is necessary to display slightly different images nearly at the same time. Accordingly, a sufficiently large number of two-dimensional images become necessary. It requires much labor and takes much time to generate the two-dimensional images. A memory for retaining data of the two-dimensional images also must have a large capacity. Furthermore, since it is necessary to rotate the screen at high speed, it is necessary to project a two-dimensional image corresponding to the direction of the screen onto the screen with high precision. It becomes necessary to maintain synchronization of the screen rotation to timing of projection of a two-dimensional image onto the screen at high precision.

In the techniques described in JP-A-2002-271820 as well, after images in the naked eyes are activated to form an apparent three-dimensional image, by projecting two-dimensional slide images onto the fast rotating screen or forming a two-dimensional image read from the cylindrical film in a peripheral spatial position, with the fast rotating mirror. In the case where the slide images are projected onto the screen, it is necessary to project a pertinent slide image onto the screen when the screen faces to the viewpoint, in the same way as the techniques described in JP-A-2001-103515 and JP-A-2002-027504. Since the screen rotates fast, however, very high precision is needed in timing of projection of the slide image onto the screen.

In the case where three-dimensional image display is conducted by using the two-dimensional images read from the cylindrical film in the techniques described in JP-A-2002-271820, complicated means for successively reading images from the cylindrical film becomes necessary. Furthermore, since the images read from the cylindrical film are subjected to image formation in the space, a clear three-dimensional image can be viewed only in the image formation position, resulting in a very limited viewing position.

SUMMARY OF THE INVENTION

In order to solve the above-described problems, the present invention has been achieved. An object of the present invention is to provide a stereoscopic display apparatus which makes it possible to view a high-resolution clear stereoscopic image from any direction without taking the projection timing of two-dimensional images into consideration.

In accordance with an aspect of the present invention, the object is achieved by using a stereoscopic display apparatus including a rotatable screen having viewing angle restriction filter, first and second mirror groups disposed concentrically around a rotation axis of the screen, each of the first and second mirror groups including a plurality of mirrors arranged in a ring form along a circular cone having the rotation axis of the screen as a central axis thereof, and an electronic projector opposed to mirror surfaces of the mirrors included in the first and second mirror groups and disposed in a position to project first and second image groups each including different frame images which represent different aspects of a substance onto the mirror surfaces of the first and second mirror groups separately, wherein the electronic projector is disposed so as to project the frame images onto the mirrors in the first and second mirror groups, and the mirrors in the first and second mirror groups are disposed on optical paths of an optical system in which the first and second frame image groups projected from the electronic projector are reflected by the mirror surfaces of the mirrors and projected onto the screen.

The second mirror group is disposed inside the first mirror group. The mirrors in the first mirror group project frame images in the first frame image group emitted from the electronic projector onto same first region on a plane of the rotating screen. And the mirrors in the second mirror group project frame images in the second frame image group emitted from the electronic projector onto same second region on the plane of the rotating screen, the second region being different from the first region.

The second mirror group is disposed inside the first mirror group. The mirrors in the first mirror group and the mirrors in the second mirror group respectively project frame images in the first frame image group emitted from the electronic projector and frame images in the second frame image group emitted from the electronic projector onto same region on a plane of the screen. As the screen rotates, the frame images in the first frame image group projected by the mirrors in the first mirror group and the frame images in the second frame image group projected by the mirrors in the second mirror group are alternately obtained on the screen.

In accordance with another aspect of the present invention, the object is achieved by using a stereoscopic display apparatus including a rotatable screen having viewing angle restriction filter, first and second mirror groups disposed concentrically around a rotation axis of the screen, each of the first and second mirror groups including a plurality of mirrors arranged in a ring form along a circular cone having the rotation axis of the screen as a central axis thereof, a first electronic projector opposed to mirror surfaces of the mirrors included in the first mirror group and disposed in a position to project a first image group including different frame images which represent different aspects of a substance onto the mirror surfaces of the first mirror group every frame image, and a second electronic projector opposed to mirror surfaces of the mirrors included in the second mirror group and disposed in a position to project a second image group including different frame images which represent different aspects of a substance onto the mirror surface of the second mirror group every frame image, wherein the first mirror group and the second mirror group are disposed respectively over and under the screen separately and so as to have opposed mirror surfaces, the first and second electronic projectors are disposed respectively over and under the first and second mirror groups separately, the mirrors in the first mirror group are disposed on optical paths of an optical system in which the first frame image group projected from the first electronic projector is reflected by the mirror surfaces of the mirrors and projected onto the screen, and the mirrors in the second mirror group are disposed on optical paths of an optical system in which the second frame image group projected from the second electronic projector is reflected by the mirror surfaces of the mirrors and projected onto the screen.

The mirrors in the first mirror group project frame images in the first frame image group emitted from the first electronic projector onto same first region on a plane of the rotating screen. The mirrors in the second mirror group project frame images in the second frame image group emitted from the second electronic projector onto same second region on the plane of the screen, the second region being different from the first region.

Display of frame images in the first frame image group on the screen and display of frame images in the second frame image group on the screen can be switched.

The mirrors in the first mirror group and the mirrors in the second mirror group respectively project frame images in the first frame image group emitted from the electronic projector and frame images in the second frame image group emitted from the electronic projector onto same region on a plane of the screen. As the screen rotates, the frame images in the first frame image group projected by the mirrors in the first mirror group and the frame images in the second frame image group projected by the mirrors in the second mirror group are alternately obtained on the screen.

In accordance with another aspect of the present invention, the object is achieved by using a stereoscopic display apparatus including a rotatable screen having viewing angle restriction filter, a half mirror group including a plurality of half mirrors arranged in a ring form along a circular cone having the rotation axis of the screen as a central axis thereof, and an electronic projector opposed to surfaces of the half mirrors included in the half mirror group and disposed in a position to project frame images in a frame image group including different frame images which represent different aspects of a substance onto the surfaces of the separate half mirrors, wherein the electronic projector is disposed so as to project the frame images included in the frame image group onto respective mirrors in the half mirror group, the half mirrors are disposed on optical paths of an optical system in which the frame images included in the frame image group projected from the electronic projector are reflected by the surfaces of the half mirrors and projected onto the screen, and the frame images projected onto the screen can be viewed through the half mirror group.

In accordance with another aspect of the present invention, the object is achieved by using a stereoscopic display apparatus including a rotatable screen having viewing angle restriction filter, first and second half mirror groups disposed concentrically around a rotation axis of the screen and respectively on upper and lower sides, each of the first and second half mirror groups including a plurality of half mirrors arranged in a ring form along a circular cone having the rotation axis of the screen as a central axis thereof, and an electronic projector opposed to surfaces of the half mirrors included in the first and second half mirror groups and disposed in a position to project first and second image groups each including different frame images which represent different aspects of a substance onto the surfaces of the half mirrors in the first and second half mirror groups separately, wherein the electronic projector is disposed so as to project the frame images onto the half mirrors in the first and second half mirror groups, and the half mirrors in the first and second mirror groups are disposed on optical paths of an optical system in which the first and second frame image groups projected from the electronic projector are reflected by the surfaces of the half mirrors and projected onto the screen.

The half mirrors in the first half mirror group and the half mirrors in the second half mirror group respectively project frame images in the first frame image group emitted from the electronic projector and frame images in the second frame image group emitted from the electronic projector onto same region on a plane of the screen. As the screen rotates, the frame images in the first frame image group projected by the half mirrors in the first half mirror group and the frame images in the second frame image group projected by the half mirrors in the second half mirror group are alternately obtained on the screen.

The screen has a property of recursive reflection. A frame image included in the first frame image group and projected onto the screen can be viewed only through the first half mirror group, and a frame image included in the second frame image group and projected onto the screen can be viewed only through the second half mirror group.

In accordance with another aspect of the present invention, the object is achieved by using a stereoscopic display apparatus including a rotatable screen having viewing angle restriction filter, a concave-shaped half mirror having a rotation axis of the screen as a central axis thereof, and an electronic projector opposed to a surface of the half mirror and disposed in a position to project first and second image groups each including different frame images which represent different aspects of a substance onto the surface of the half mirror, wherein the electronic projector is disposed so as to project the frame images onto the half mirror, and the half mirror is disposed on optical paths of an optical system in which the first and second frame image groups projected from the electronic projector are reflected by the surface of the half mirror and projected onto the screen.

The screen has a property of recursive reflection. A frame image included in the first frame image group and projected onto the screen can be viewed through the half mirror from only a direction in which the frame image in the first frame image group is projected onto the screen. A frame image included in the second frame image group and projected onto the screen can be viewed through the half mirror from only a direction in which the frame image in the second frame image group is projected onto the screen.

The half mirror takes a shape of a part of a rotating elliptical surface. The screen is disposed in one of focus positions of the rotating elliptical surface formed by the half mirror, and the electronic projector is disposed in the other of the focus positions.

According to the present invention, it is not necessary to take the timing of projection of each frame image onto the screen into consideration. In addition, it becomes possible to obtain a plurality of clear stereoscopic images improved in resolution at the same time. Furthermore, a stereoscopic image improved in angle resolution can be obtained.

Other objects, features and advantages of the invention will become apparent from the following description of the embodiments of the invention taken in conjunction with the accompanying drawings.

BRIEF DESCRIPTION OF THE DRAWINGS

FIGS. 36A and 36B are diagrams showing a fifth embodiment shown in FIG. 31 in contradistinction to a fourth embodiment shown in FIG. 26.

DETAILED DESCRIPTION OF THE EMBODIMENTS

Hereafter, embodiments of the present invention will be described with reference to the drawings.

Figure 1:
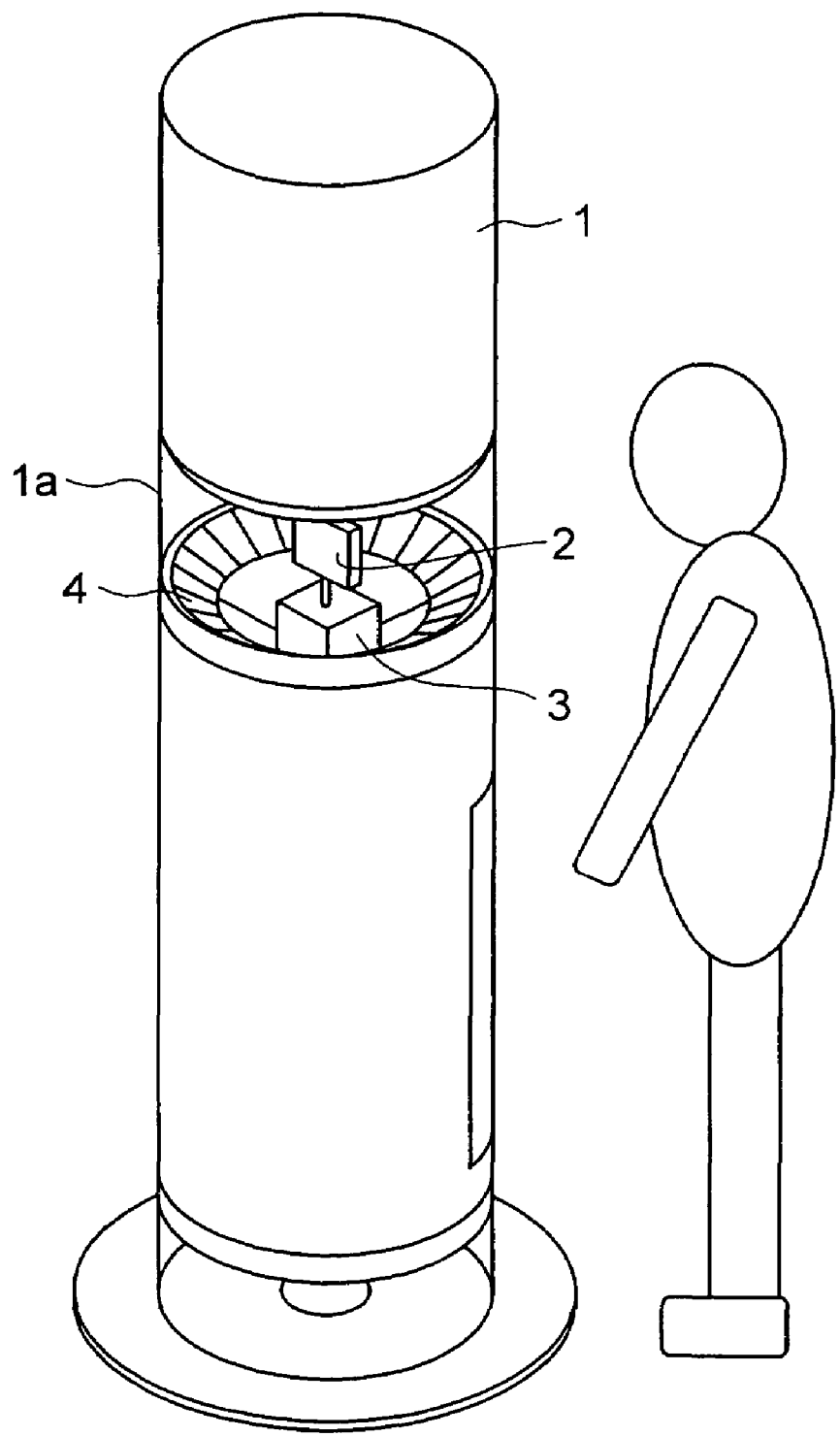
FIG. 1 is an oblique exterior view showing the whole of a first embodiment of a stereoscopic display apparatus according to the present invention.

FIG. 1 is an oblique exterior view showing the whole of a first embodiment of a stereoscopic display apparatus according to the present invention. Reference numeral 1 denotes a casing, 1a a perspective unit, 2 a screen having viewing angle restriction means, 3 a rotation mechanism unit (rotation drive source) for driving and rotating the screen having viewing angle restriction means, and 4 a polygonal mirror (mirror group).

In FIG. 1, the perspective unit 1a is disposed in at least a part of the cylindrical casing 1, i.e., a part corresponding to the eye height of a viewer so as to make it possible for the viewer to view the inside. In this part of the casing 1, the screen 2 having viewing angle restriction means, the rotation mechanism unit 3 for rotating and driving the screen, and the polygonal mirror 4 are disposed. The screen 2 having viewing angle restriction means is driven by the rotation mechanism unit 3 to rotate around a central axis of the cylindrical casing 1 continuously or stepwise. The polygonal mirror 4 is a circular-cone-shaped group of mirrors including a plurality of mirrors disposed in a ring form on a circular locus having the same radius from the central axis of the cylindrical casing 1, on a circular cone having the central axis of the cylindrical casing 1 as its central axis.

Figure 2:
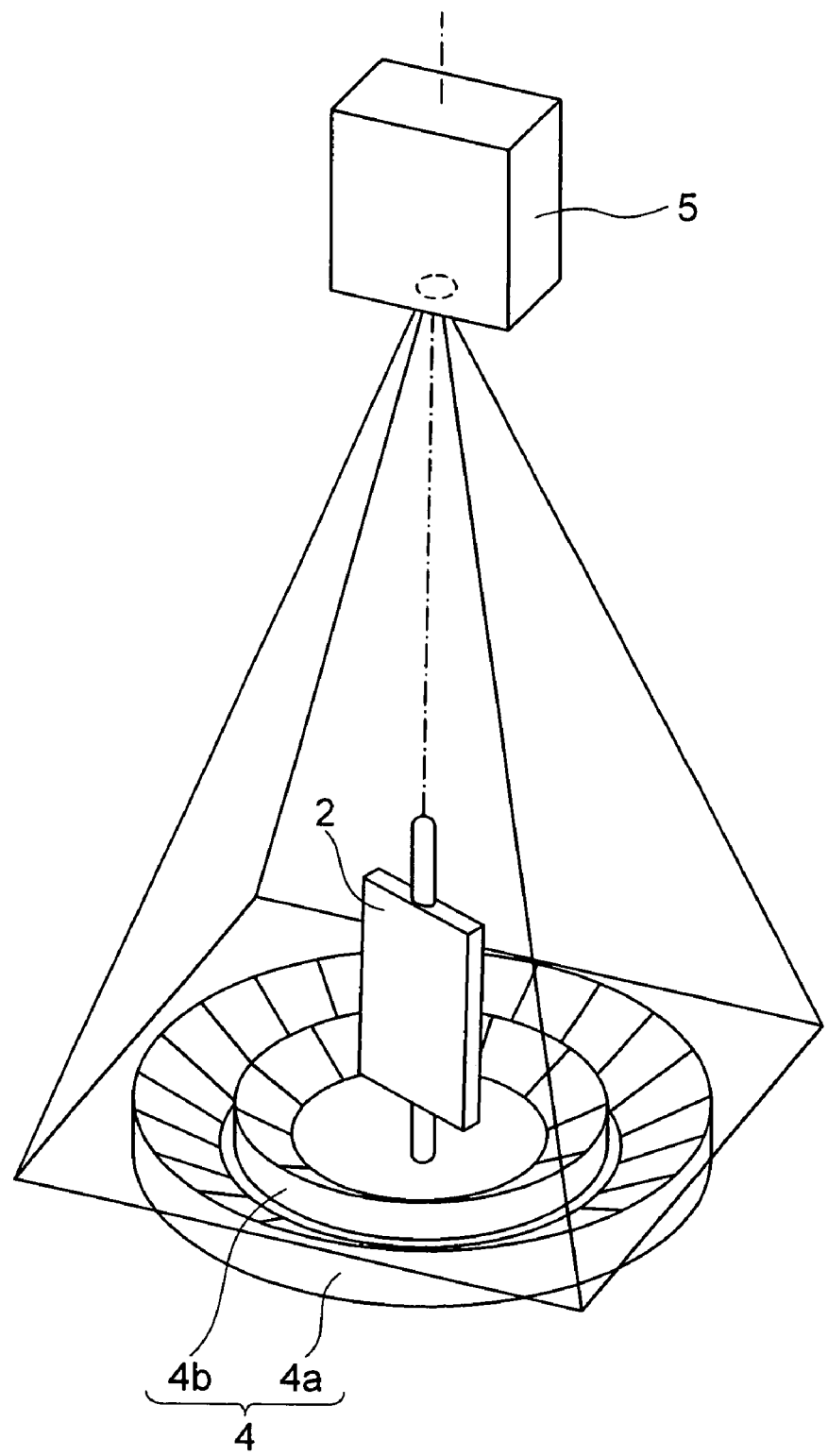
FIG. 2 is an oblique view showing an internal structure of the first embodiment shown in FIG. 1.

FIG. 2 is an oblique view showing an internal structure of the embodiment shown in FIG. 1. Reference characters 4a and 4b denote polygonal mirrors. Reference numeral 5 denotes an electronic projector. Components corresponding to those shown in FIG. 1 are denoted by like reference characters, and duplicated description of them will be omitted.

In FIG. 2, the polygonal mirror 4 includes two different polygonal mirrors 4a and 4b. The polygonal mirror 4a and the polygonal mirror 4b are circular cone shaped mirror groups each including a plurality of mirrors disposed in a ring form as described above, on different circular cones each having the central axis of the casing 1 (FIG. 1) of the stereoscopic display apparatus as its center. Furthermore, the electronic projector 5 is disposed over the screen 2 having viewing angle restriction means in the casing 1 (FIG. 1). The electronic projector 5 uses liquid crystal or the like, and projects images onto the polygonal mirrors 4a and 4b. The images are reflected by mirrors in the polygonal mirrors 4a and 4b, and then projected onto the screen 2 having viewing angle restriction means. As shown in FIG. 1, the viewer can view the images projected onto the screen 2 having viewing angle restriction means.

Figure 3:
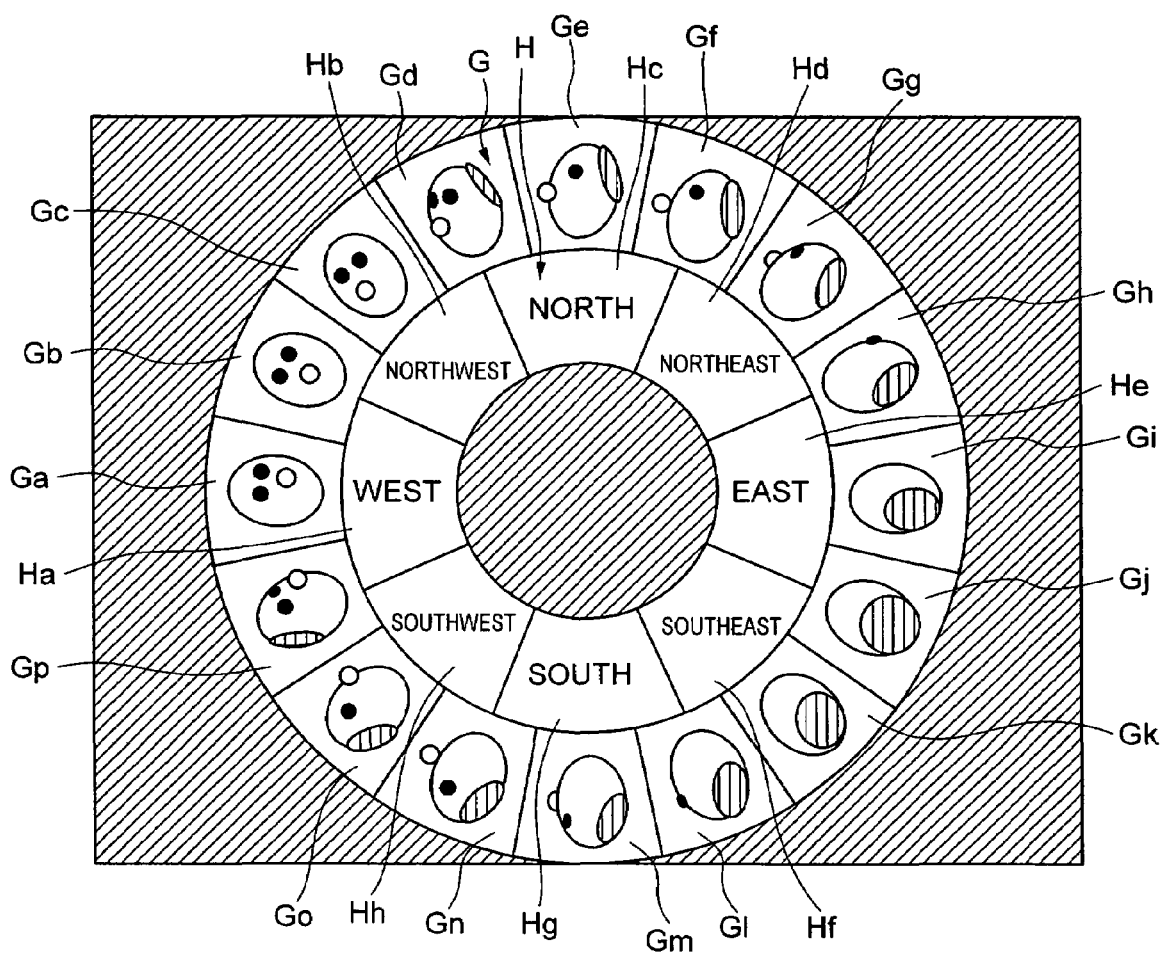
FIG. 3 is a diagram showing one concrete example of images projected by an electronic projector shown in FIG. 2.

FIG. 3 shows one concrete example of images projected by the electronic projector 5. It represents a group (hereafter referred to as frame image group G) of as many frame images Ga to Gp as the number of mirrors in the polygonal mirror 4a arranged in a ring form and a group (hereafter referred to as frame image group H) of as many frame images Ha to Hh as the number of mirrors in the polygonal mirror 4b arranged concentrically with the frame images Ga to Gp inside the frame images Ga to Gp. The frame images Ga to Gp are images obtained when the same substance is viewed from different positions around the substance. For example, supposing that the frame image Ga is a frame image obtained when the substance is viewed from the front thereof, the frame image Gi is an image obtained when the same substance is viewed from the right behind. Positions of the frame images Ga to Gp on the projected image face are associated with the positions in which the substance is viewed. The frame images Ga to Gp are respectively reflected by separate mirrors in the polygonal mirror 4a and projected onto the screen 2 having viewing angle restriction means. The frame images Ha to Hh are also images obtained when the same substance is viewed from different positions around it. Here, it is supposed that the images Ha to Hh are images obtained when the same direction display apparatus is viewed from different directions. For example, the frame image Ha represents display contents ("west") of the direction display apparatus obtained when the direction display apparatus. In the same way, the frame image He represents "east."

Figure 4:
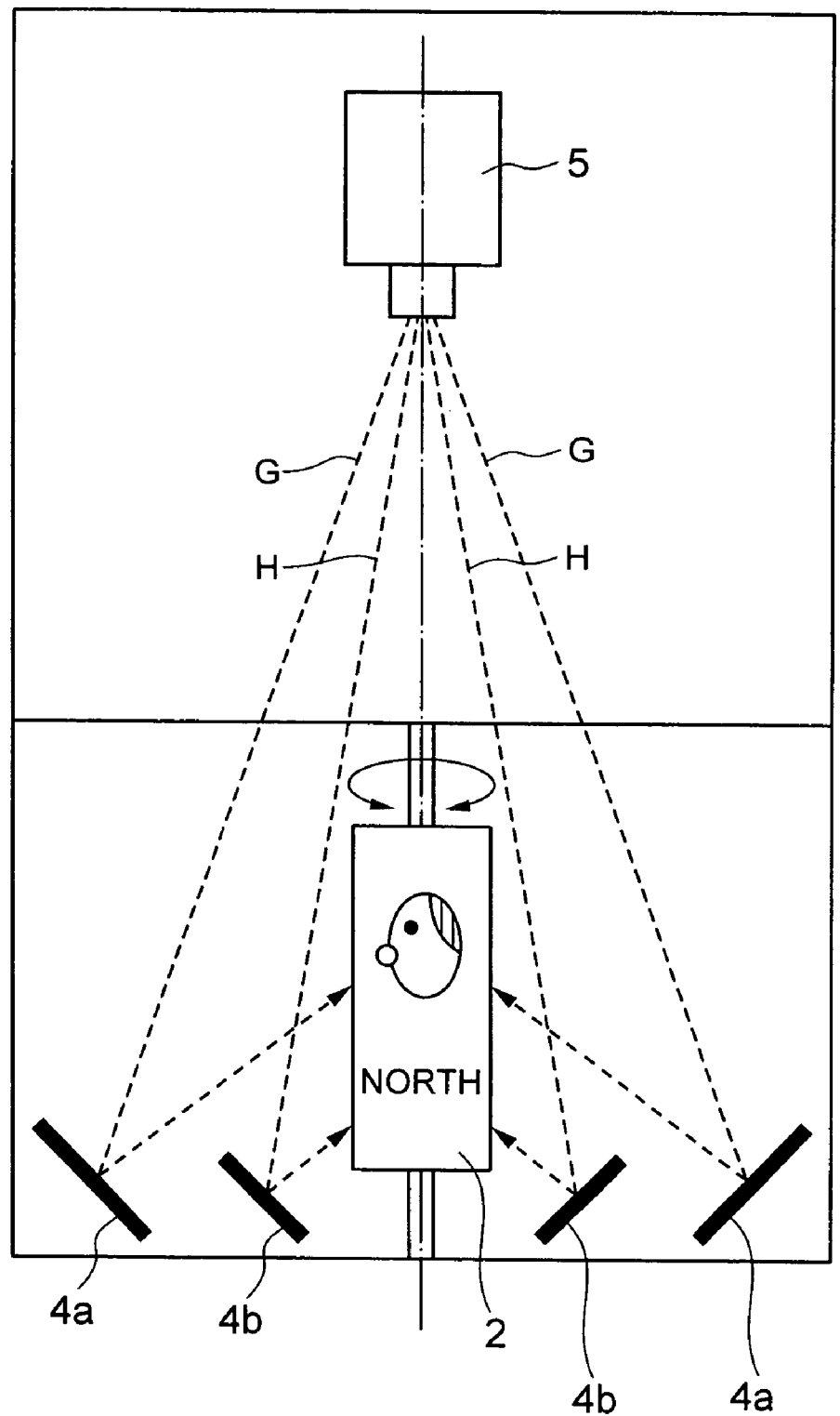
FIG. 4 is a diagram showing a projection state of frame images G and H shown in FIG. 3 in the first embodiment shown in FIG. 2.

FIG. 4 is a diagram showing a projection state of frame image groups G and H shown in FIG. 3 in the embodiment shown in FIG. 2. Components corresponding to those in preceding drawings are denoted by like reference characters, and duplicated description of them will be omitted.

In FIG. 4, the frame image group G emitted from the electronic projector 5 is reflected by the polygonal mirror 4a, and projected onto the screen 2 having viewing angle restriction means. The frame image group H emitted from the electronic projector 5 is reflected by the polygonal mirror 4b, and projected onto the screen 2 having viewing angle restriction means. When the viewer views the screen 2 having viewing angle restriction means, therefore, the viewer can view two projected images resulting from the frame image group G and the frame image group H.

Figure 5:
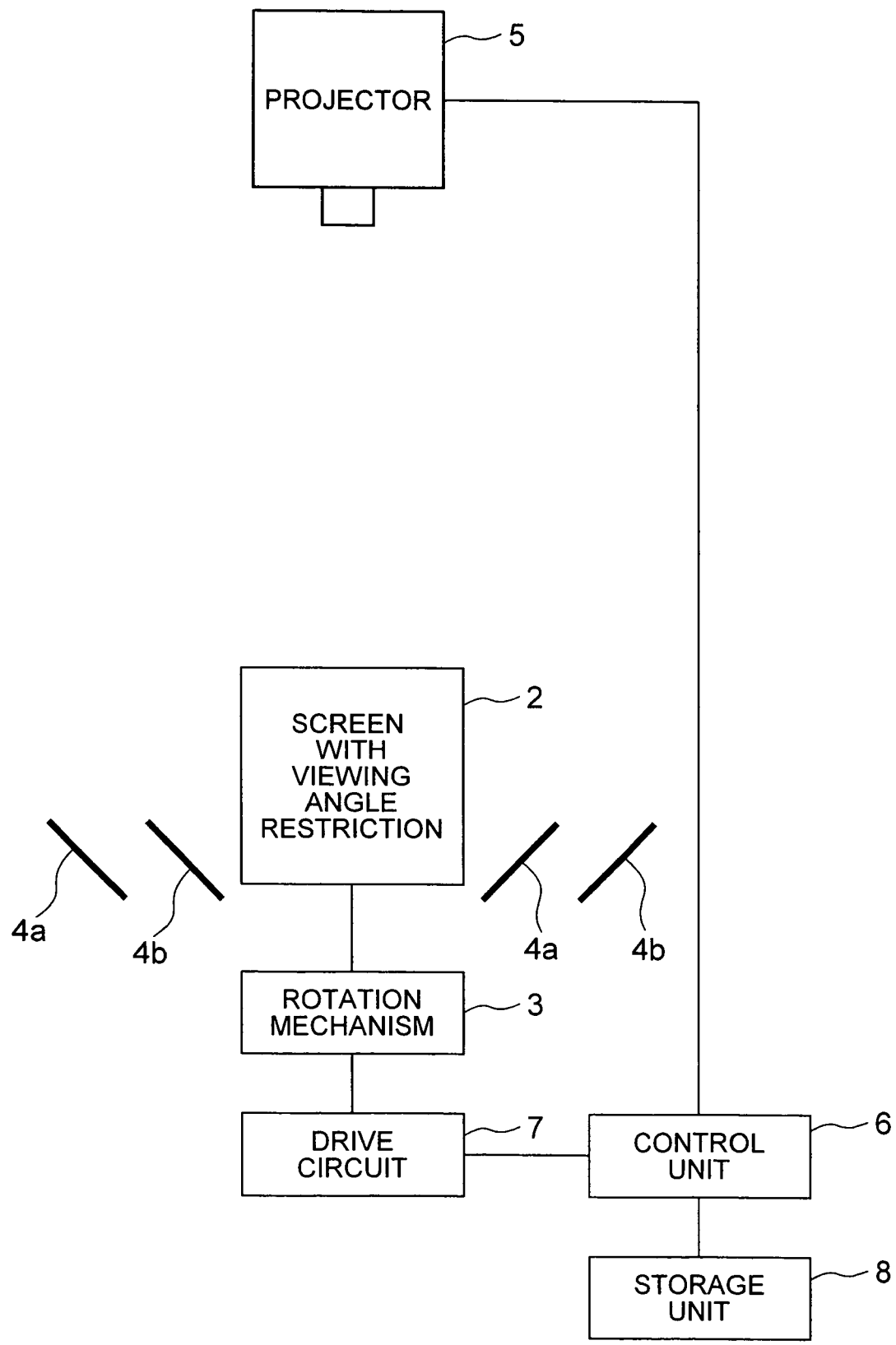
FIG. 5 is a diagram schematically showing a system configuration of the first embodiment shown in FIG. 2.

FIG. 5 is a diagram schematically showing a system configuration of the first embodiment shown in FIG. 1. Reference numeral 6 denotes a control unit, 7 a drive circuit, and 8 a storage unit. Components corresponding to those in preceding drawings are denoted by like reference characters.

In FIG. 5, video data representing the frame image group G including frame images Ga to Gp and the frame image group H including frame images Ha to Hh shown in FIG. 3 are stored in the storage unit 8. The control unit 6 drives the rotation mechanism unit 3 and rotates the screen 2 having viewing angle restriction means by controlling the drive circuit 7. Furthermore, the control unit 6 reads out the video data from the storage unit 8, supplies the video data to the electronic projector 5, and projects images shown in FIG. 3. The projection images included in the frame image groups G and H may be generated arbitrarily by using computer graphics or the like, or may be generated by picking up images with a CCD camera. In the case where images are picked up with a CCD camera to generate the projection images, it is also possible to conduct the generation in a remote place, receive the generated video data, and store the video data in the storage unit 8.

Figure 6:
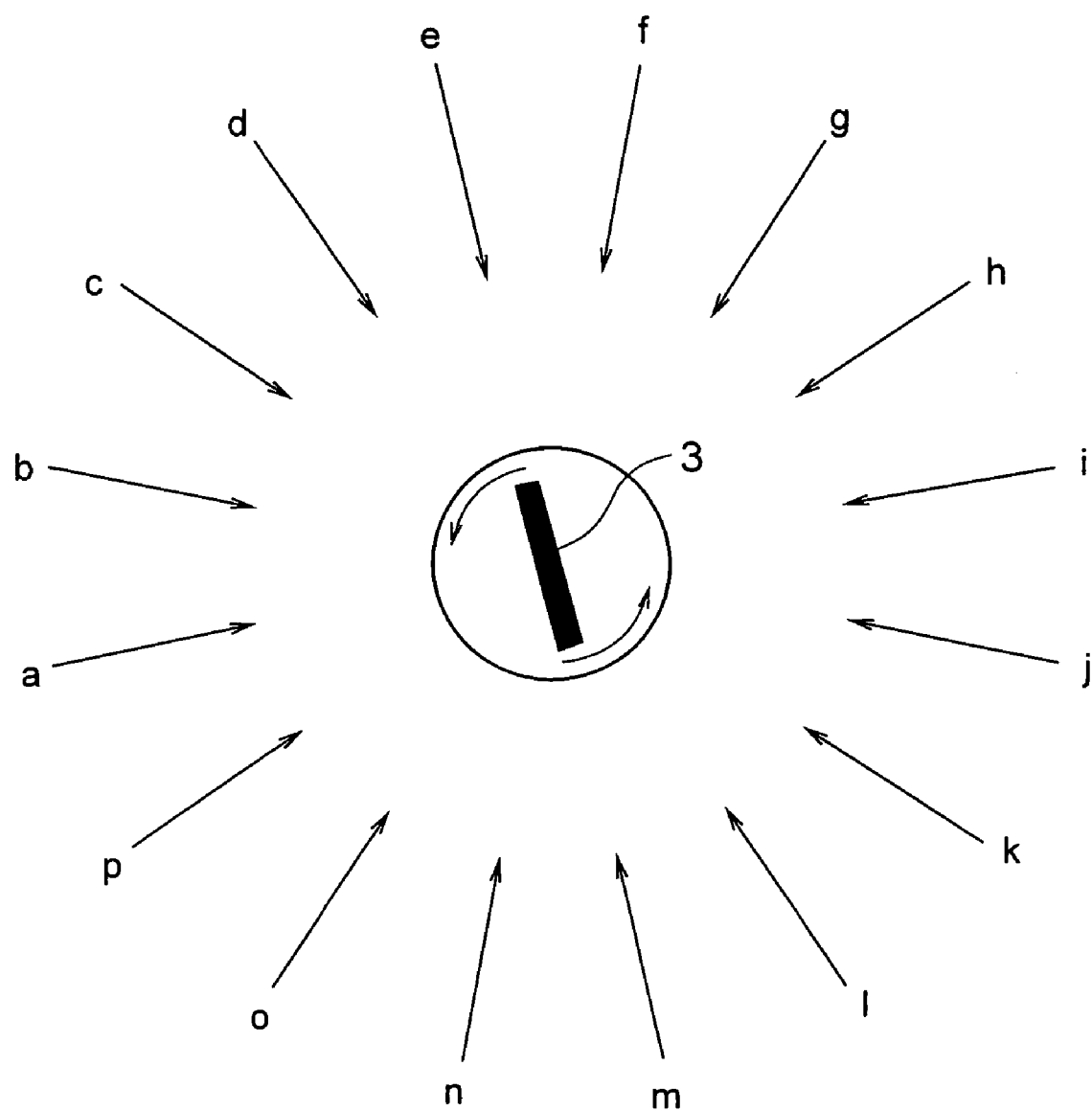
FIG. 6 is a diagram showing directions with respect to a screen having viewing angle restriction means shown in FIG. 4.

In the configuration heretofore described, the control unit 6 reads out video data from the storage unit 8, and supplies the video data to the electronic projector 5. According to the received video data, the electronic projector 5 emits images shown in FIG. 3. The emitted frame images Ga to Gp in the frame image group G are reflected respectively by different mirrors in the polygonal mirror 4a and projected onto the screen 2 having viewing angle restriction means. The emitted frame images Ha to Hh in the frame image group H are reflected respectively by different mirrors in the polygonal mirror 4b and projected onto the screen 2 having viewing angle restriction means. Denoting directions of viewing the screen 2 having viewing angle restriction means from the periphery of the screen 2 having viewing angle restriction means by "a" to "p" as shown in FIG. 6, therefore, the frame images Ga to Gp are projected onto the screen 2 having viewing angle restriction means respectively from "a" (west), "b" (west-northwest), "c" (northwest), "d" (north-northwest), "e" (north), "f" (north-northeast), "g" (northeast), "h" (east-northeast), "i" (east), "j" (east-southeast), "k" (southeast), "l" (south-southeast), "m" (south), "n" (south-southwest), "o" (southwest) and "p" (west-southwest) directions. Furthermore, the frame images Ha to Hh are projected onto the screen 2 having viewing angle restriction means respectively from "a", "c", "e", "g", "i", "k", "m" and "o" directions.

Figure 7:
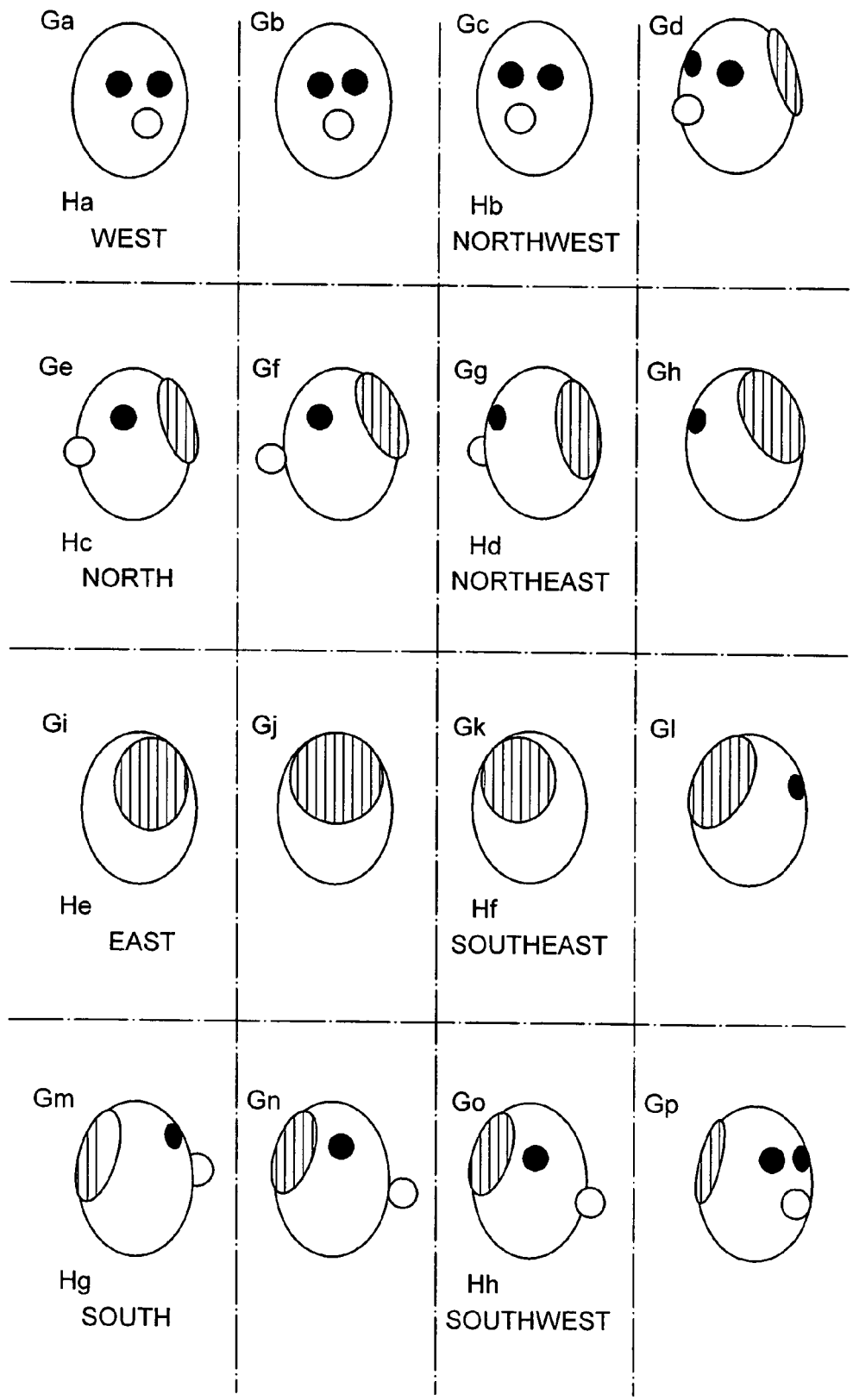
FIG. 7 is a diagram showing frame images in respective directions displayed on a screen having viewing angle restriction means shown in FIG. 4.

As a result, different frame images Ga to Gp and frame images Ha to Hh are displayed on the screen 2 having viewing angle restriction means, according to a direction in which the viewer views the screen 2 having viewing angle restriction means from the periphery, as shown in FIG. 7. Here, the frame images Ga to Gp are images projected onto the screen 2 having viewing angle restriction means when the viewer views from the "a" to "p" directions shown in FIG. 6. For example, in the case where the viewer views the screen 2 having viewing angle restriction means from the "a" (west) direction, the frame image Ga is displayed on the screen 2 having viewing angle restriction means and the viewer can view it, when the plane of the screen 2 having viewing angle restriction means faces to the "a" direction. In addition, when the plane of the screen 2 having viewing angle restriction means faces the "a", "c", "e", "g", "i", "k", "m" and "o" directions, the frame images Ha to Hh are respectively displayed on the plane of the screen 2 having viewing angle restriction means and the viewer can view the pertinent frame image. In the "a", "c", "e", "g", "i", "k", "m" and "o" directions, frame images Ga and Ha, frame images Gc and Hb, frame images Ge and Hc, frame images Gg and Hd, frame images Gi and He, frame images Gk and Hf, frame images Gm and Hg and frame images Go and Hh are displayed at the same time respectively and the viewer can view the pertinent frame images. However, it is not the case that these image groups G and H can be viewed only when the plane of the screen 2 having viewing angle restriction means faces to the direct front. Even if the plane of the screen 2 having viewing angle restriction means is slightly inclined from the direct front, these image groups G and H can be viewed.

If the screen 2 having viewing angle restriction means is continuously viewed in the above-described configuration from one direction, for example, the "a" direction shown in FIG. 6, the frame images Ga and Ha are simultaneously projected onto the screen 2 having viewing angle restriction means, when the plane of the screen 2 having viewing angle restriction means faces to the "a" direction. Therefore, these frame images can be viewed from the "a" direction. In other words, the frame images Ga and Ha are displayed once, each time the projection plane of the screen 2 having viewing angle restriction means faces the direct front. In order to make the frame image groups G and H representing one aspect of the stereoscopic image look as a continuous image without flicker, therefore, the rotation speed of the screen 2 having viewing angle restriction means must be set so as to face the projection plane of the screen 2 having viewing angle restriction means to the front and display the next frame images when the frame image groups G and H are remained in vision by after images in the eyes. In this way, the minimum rotation speed of the screen 2 having viewing angle restriction means is determined.

Figure 8A:
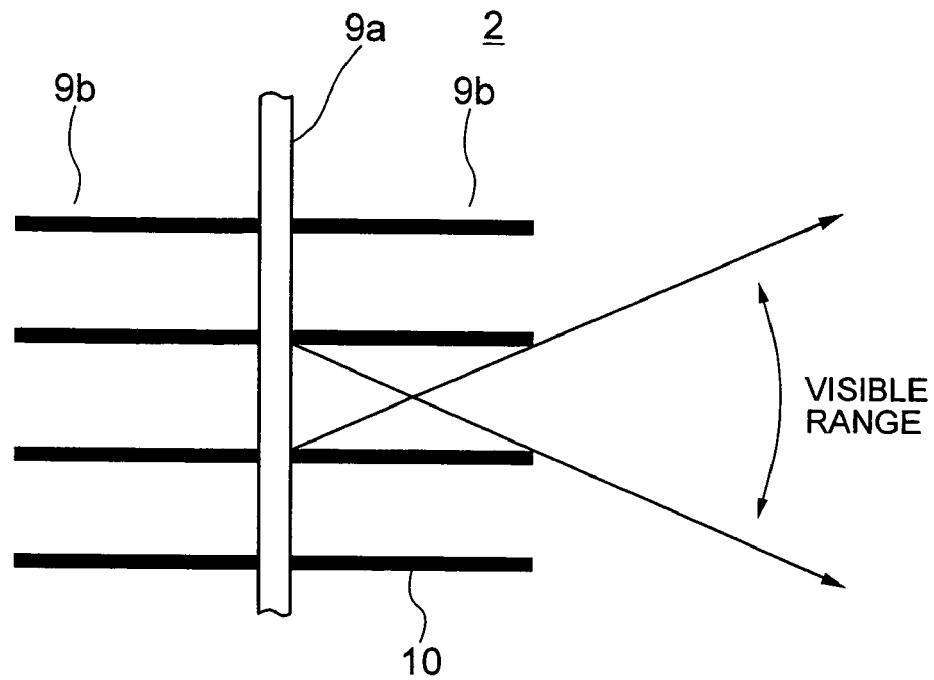
FIGS. 8A and 8B are diagrams of one concrete example of a screen having viewing angle restriction means shown in FIG. 1.
Figure 8B:
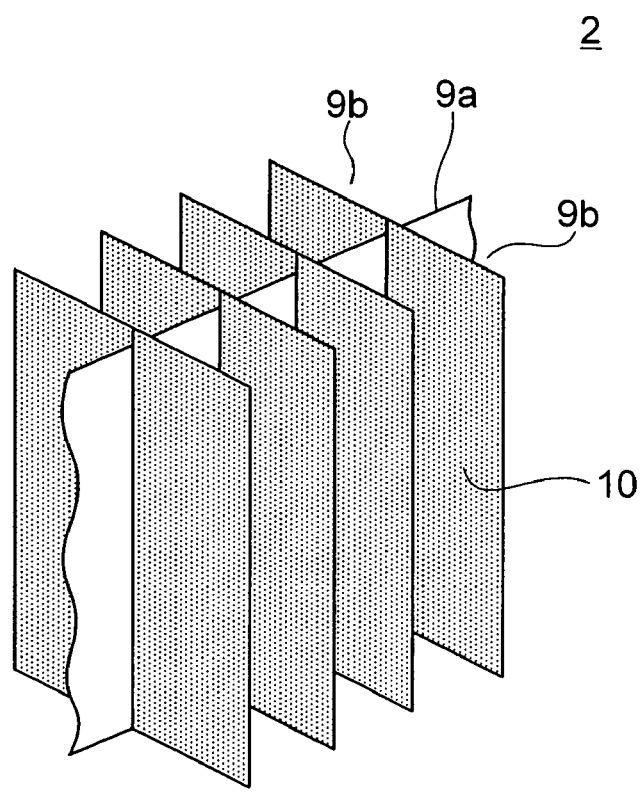
Figure 9A:
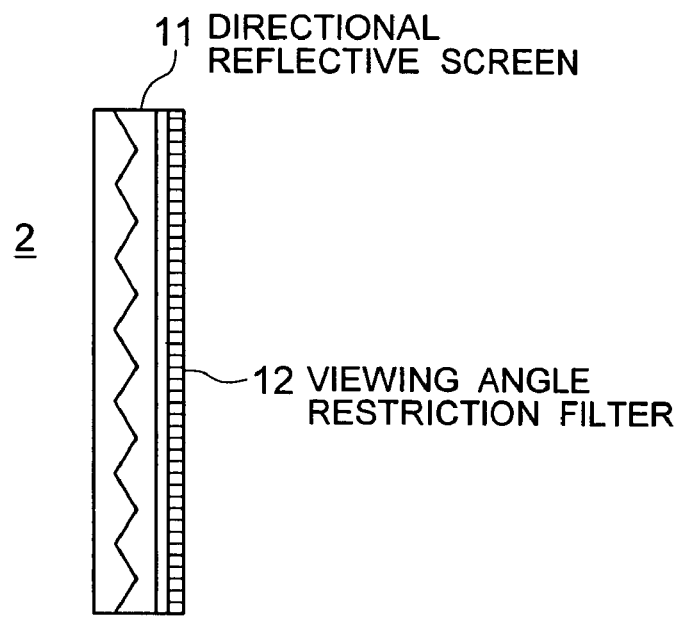
FIGS. 9A and 9B are configuration diagrams showing another concrete example of a screen having viewing angle restriction means shown in FIG. 1.

FIG. 8A is a sectional view showing a part of one concrete example of the screen 2 having viewing angle restriction means shown in FIG. 1. FIG. 8B is its oblique view. In FIGS. 8A and 8B, 9a denotes a plate-shaped screen member, 9b a viewing angle restriction filter, and 10 a fin.

In FIGS. 8A and 8B, the screen 2 having viewing angle restriction means has the viewing angle restriction filter 9b including a plurality of shading fins 10 on each side of the plate-shaped screen member 9a. Each of the fins 10 has a thickness in the range of, for example, 100 to 200 μm. The fins 10 are arranged with a pitch of the dimension of a pixel on the screen 2 having viewing angle restriction means, for example, a pitch in the range of approximately 0.5 to 2 mm. Even if the screen 2 having viewing angle restriction means is viewed from any direction when images shown in FIG. 3 are projected, frame images (adjacent frame images) projected by adjacent mirrors in the polygonal mirrors 4a and 4b are shaded and only frame images projected by pertinent mirrors in the direction are visible.

The viewing angle restriction filter 9b functions to restrict the viewing angle by using the fins 10 and thereby make adjacent frame images invisible. The height of the fins 10 is set according to the viewing restriction angle (visible range). Alternatively, a configuration having a cylindrical lens for gathering light in the viewing angle restriction direction may be used.

Figure 9B:
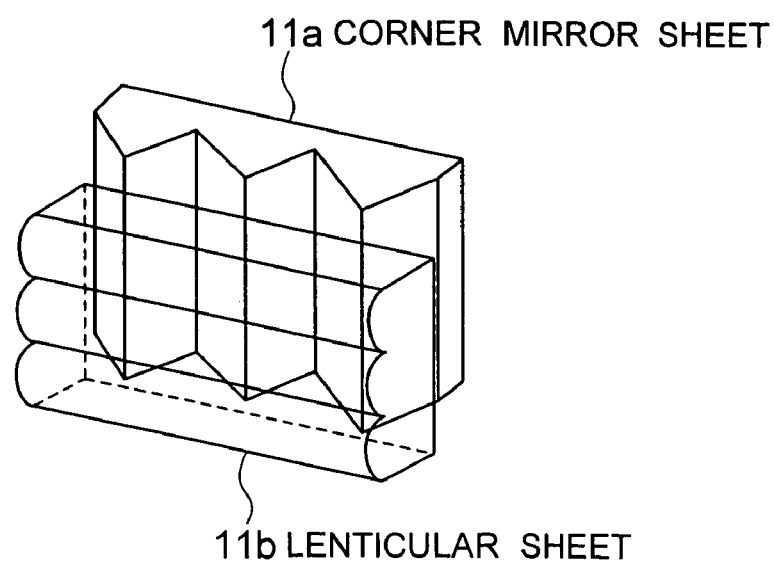

As another concrete example of the screen 2 having viewing angle restriction means shown in FIG. 1, a directional reflecting screen material as described in JP-A-11-258697 may also be used. FIG. 9A is a sectional view showing the screen 2 having viewing angle restriction means that uses such a directional reflecting screen material. Reference numeral 11 denotes a directional reflecting material screen, and 12 denotes a viewing angle restriction filter. FIG. 9B is an oblique view showing a configuration of the directional reflecting material screen 11. In FIG. 9B, 11a denotes a corner mirror sheet, and 11b a lenticular sheet.

In the configuration of the concrete example shown in FIG. 9A, the viewing angle restriction filter 12 is disposed on the directional reflecting material screen 11. As shown in FIG. 9B, the directional reflecting material screen 11 includes the corner mirror sheet 11a and the lenticular sheet 11b. The directional reflecting material screen 11 has a property of conducting recursive reflection in a direction horizontal to incident light and conducting diffuse reflection in the vertical direction. The directional reflecting material screen 11 reflects light which is incident at an incidence angle within ±45° in the horizontal direction, to the incidence direction. In other words, while the directional reflecting material screen 11 is rotating in the range of ±45° on the left and right sides with respect to a state in which the screen rightly faces the viewer, the viewer can see the same images. In the screen 2 having the viewing angle restriction means that uses the directional reflecting material screen 11, therefore, the range of the incidence angle that makes reflection to a predetermined direction possible is wider as compared with the screen 2 having viewing angle restriction means that has a configuration shown in FIGS. 8A and 8B. Therefore, the quantity of reflected light is light. As a result, brighter images can be obtained as compared with the case where the screen 2 having viewing angle restriction means that has the configuration shown in FIGS. 8A and 8B is used.

Figure 10:
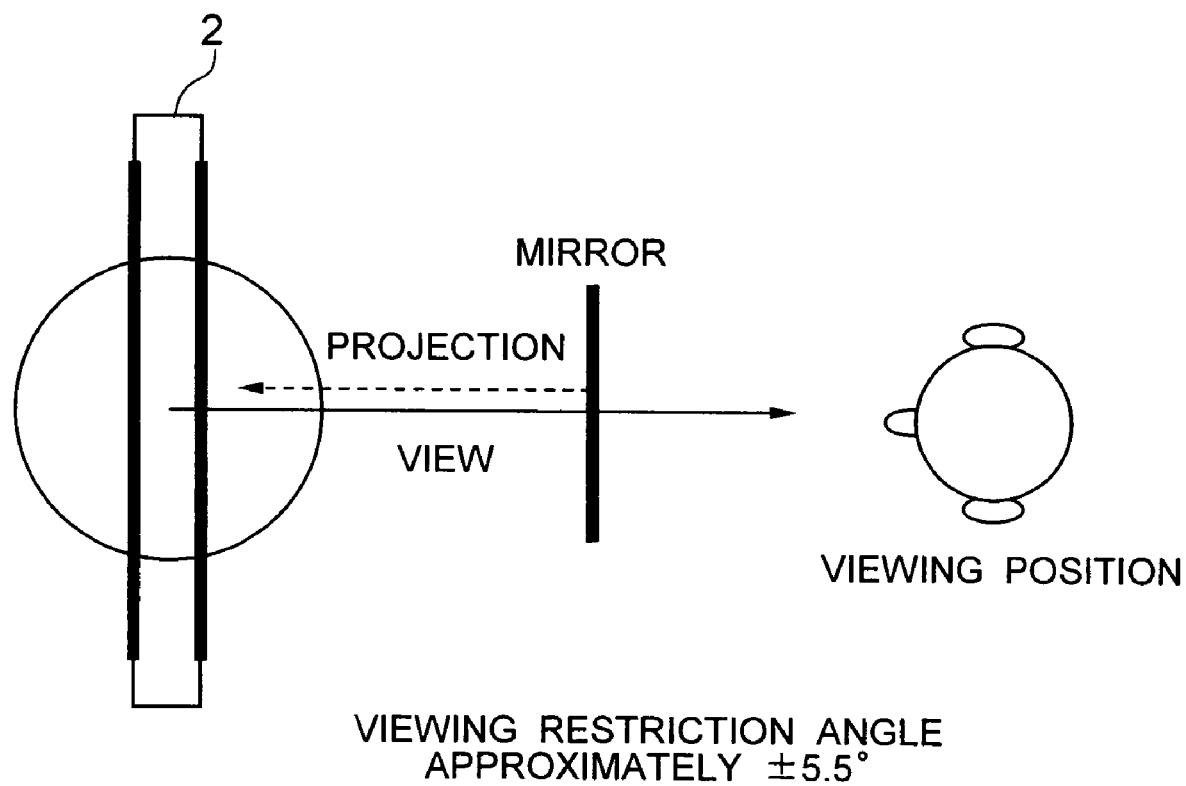
FIG. 10 is a diagram showing a visual field limiting angle.

If only the directional reflecting material screen 11 is used, however, light is reflected in a direction different from the incidence direction in some cases according to the incidence angle of light. As a result, frame images from a plurality of directions overlapping each other are viewed in some viewing directions. In order to prevent such reflected light from other directions and make the viewer view only a frame image according to the direction, therefore, the viewing angle restriction filter 12 is also provided as shown in FIG. 9A. In the same way as the viewing angle restriction filter 9b shown in FIGS. 8A and 8B, the viewing angle restriction filter 12 has a structure in which fins are arranged with a fine pitch. The viewing angle restriction filter 12 (viewing angle restriction optical system) 12 having a viewing angle restriction (visible range) of approximately ±24° with respect to a normal line of the surface of the directional reflecting material screen 11 is stuck on the directional reflecting material screen 11. As a result, reflected light of frame images from the neighborhood is shaded. As shown in FIG. 10, therefore, only frame images from a correct direction among the directions "a" to "p" (FIG. 6) are displayed and can be viewed. If the viewer moves round the screen 2 having viewing angle restriction means and the viewing direction is changed as represented by "a, b, c, . . . , p," it becomes possible to view only a frame image Ga-Gp and a frame image Ha-Hh (FIG. 7) according to the viewing direction every viewing direction. An effect that a plurality of persons can enjoy images simultaneously from arbitrary directions is obtained. A double-sided screen 2 having viewing angle restriction means can be generated by adhering two directional reflecting material screens 11 back to back and sticking the viewing angle restriction filter 12 to the surface of each of the directional reflecting material screens 11. In the case where the double-sided screen 2 having viewing angle restriction means is used, the viewer views images projected from mirrors in a certain direction twice, while the screen makes one revolution, unlike a single-sided screen 2 having viewing angle restriction means. As a result, brighter images can be viewed.

Figure 11:
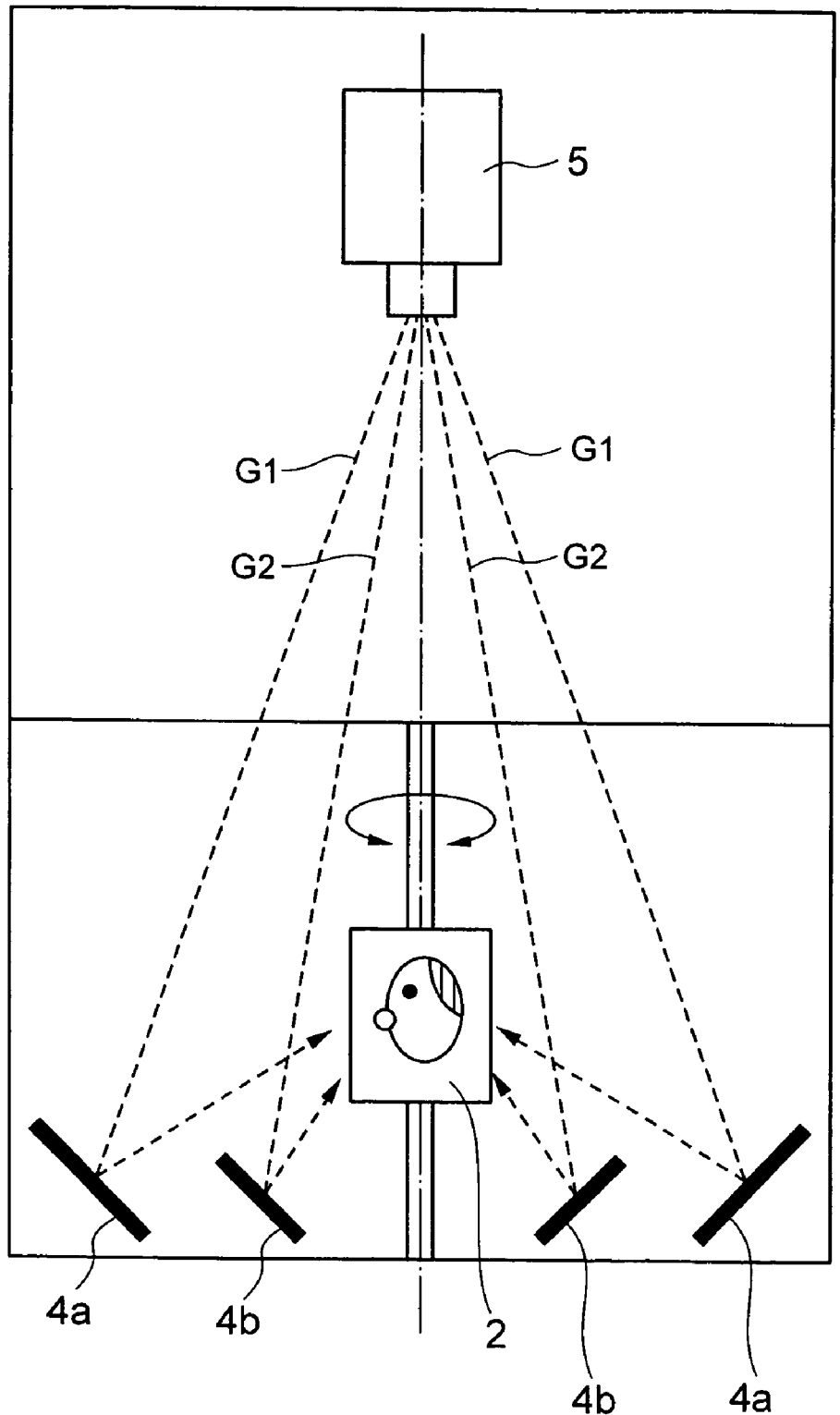
FIG. 11 is a principal part configuration diagram showing one variant of a first embodiment shown in FIG. 2.

FIG. 11 is a principal part configuration diagram showing one variant of the first embodiment of the stereoscopic display apparatus shown in FIG. 1. Components corresponding to those shown in FIG. 1 are denoted by like reference characters, and duplicated description of them will be omitted. In this variant as well, its system configuration is the same as that shown in FIG. 5.

In this variant, the electronic projector 5 projects frame images of the same substance onto the polygonal mirrors 4a and 4b as shown in FIG. 5. However, the viewing direction for the frame image projected onto the polygonal mirror 4a and that for the frame image projected onto the polygonal mirror 4b are deviated slightly in the horizontal direction.

Figure 12:
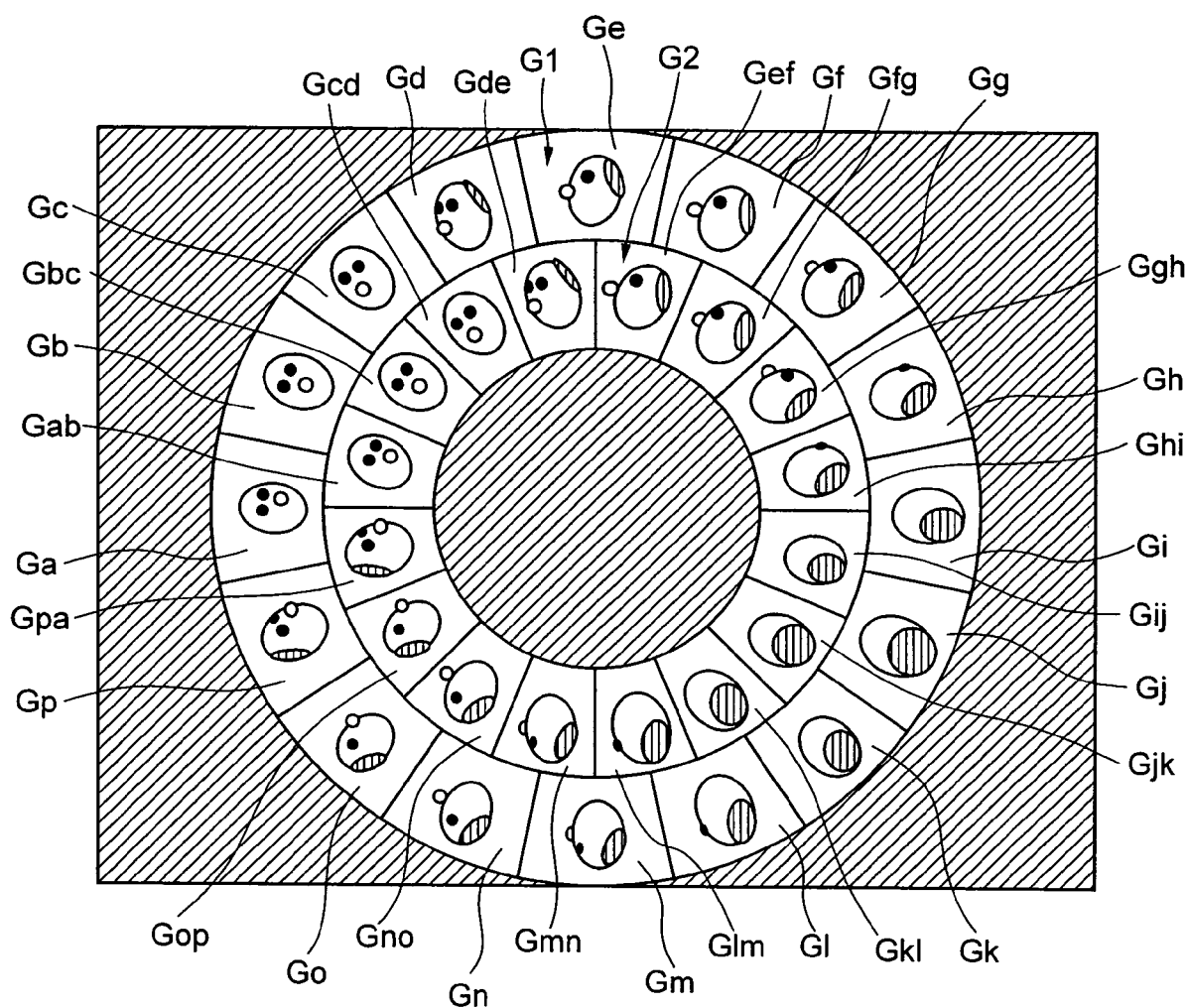
FIG. 12 is a diagram showing one concrete example of images emitted from an electronic projector shown in FIG. 11.

FIG. 12 is a diagram showing one concrete example of images sent out from the electronic projector shown in FIG. 11.

A group (hereafter referred to collectively as frame image group G1) of as many frame images Ga to Gp as the number of mirrors in the polygonal mirror 4a in FIG. 11 arranged in the ring form and a group (hereafter referred to collectively as frame image group G2) of as many frame images Gab to Gpa as the number of mirrors in the polygonal mirror 4b in FIG. 11 arranged concentrically with the frame images Ga to Gp and inside them are shown in FIG. 12. It is now supposed that the polygonal mirrors 4a and 4b include the same number of (here, 16) mirrors.

In the same way as the frame image group G, these frame images Ga to Gp are images obtained when the same substance is viewed from different directions around the substance. For example, supposing that the frame image Ga is a frame image obtained when the substance is viewed from the front thereof, the frame image Gi is an image obtained when the same substance is viewed from the right behind. Positions of the frame images Ga to Gp on the projected image face are associated with the positions in which the substance is viewed. The frame images Ga to Gp are respectively reflected by separate mirrors in the polygonal mirror 4a and projected onto the screen 2 having viewing angle restriction means.

The frame image group G2 is a collection of images obtained by viewing the substance from directions each oriented between viewing directions for two adjacent frame images in the frame image group G1. For example, an image obtained by viewing the substance from an "a" direction is the frame image Ga, and an image obtained by viewing the substance from a "b" direction is the frame image Gb. An image obtained by viewing the substance from a direction oriented between the "a" and "b" directions is a frame image Gab. For example, supposing that the frame image Ga in the frame image group G1 is an image obtained by viewing the substance from the west direction and the frame image Gb is an image obtained by viewing the substance from the west-northwest direction, the image Gab is an image obtained by viewing the substance from a direction oriented between the west and the west-northwest. (Hereafter, this is represented by expression that images in the frame image group G2 are images between images in the frame image group G1. Conversely, images in the frame image group G1 are images between images in the frame image group G2.)

Among images emitted from the electronic projector 5 in FIG. 11, images in the frame image group G1 shown in FIG. 12 are reflected respectively by separate mirrors in the polygonal mirror 4a and projected onto the screen 2 having viewing angle restriction means. Images in the frame image group G2 are reflected respectively by separate mirrors in the polygonal mirror 4b and projected onto the screen 2 having viewing angle restriction means. In this case, inclination angles of the mirrors in the polygonal mirrors 4a and 4b with respect to the screen 2 having viewing angle restriction means are set so as to make a display position on the screen 2 having viewing angle restriction means of an image in the frame image group G1 projected from a mirror when the screen 2 having viewing angle restriction means faces the front of the mirror coincide with a display position on the screen 2 having viewing angle restriction means of an image in the frame image group G2 projected from a mirror when the screen 2 having viewing angle restriction means faces the front of the mirror. Furthermore, the viewing angle of the screen 2 having viewing angle restriction means is also restricted to be narrower than that of the case shown in FIGS. 2 and 4 so as to prevent frame images from the polygonal mirror 4a and frame images from the polygonal mirror 4b from being overlapped and simultaneously displayed.

In this variant, images of the same substance viewed from different directions are thus displayed by using the double mirror groups. As compared with the embodiment using the images shown in FIG. 3, therefore, images are changed to images viewed from a direction by slightly changing the viewing direction of the screen 2 having viewing angle restriction means in the horizontal direction. It thus becomes possible to view three-dimensional images with a fine angle resolution in the horizontal direction.

Figure 13A:
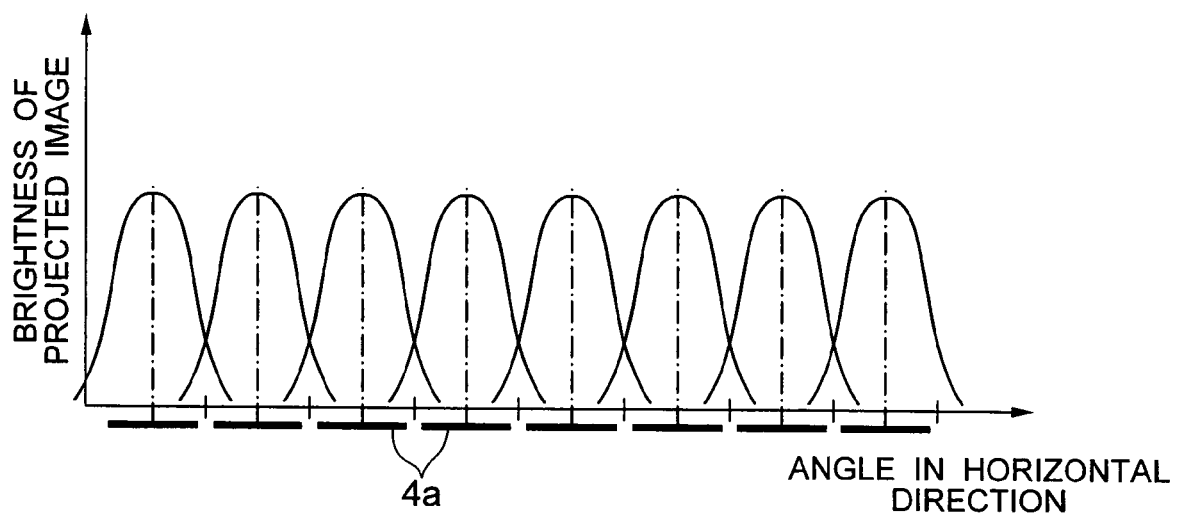
FIGS. 13A and 13B are diagrams showing a horizontal angle resolution of images obtained by using a polygonal mirror in a first embodiment shown in FIG. 2.
Figure 13B:
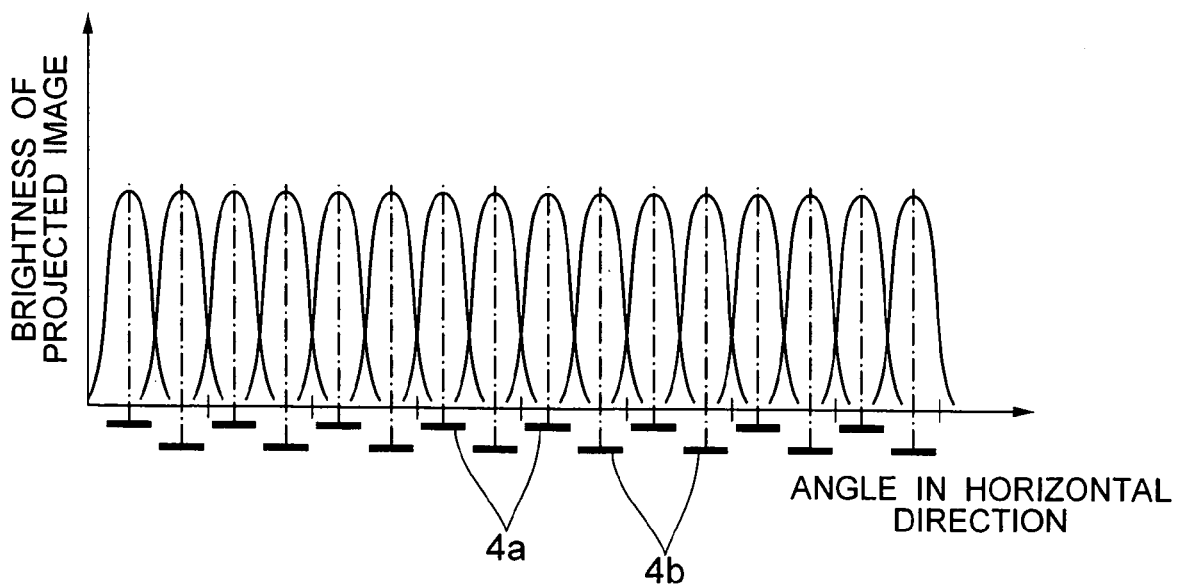
Figure 23:
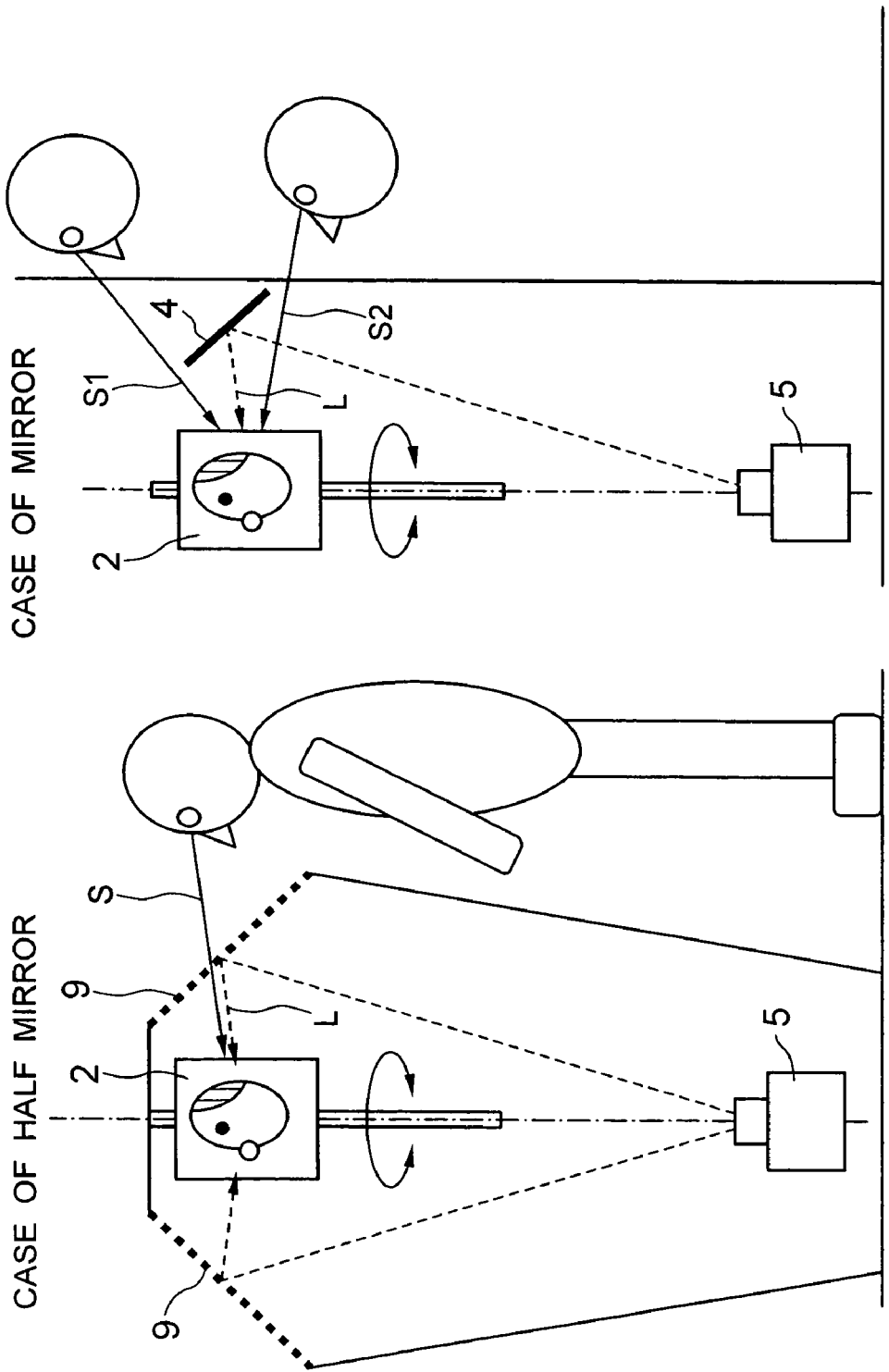
FIGS. 23A and 23B are diagrams showing a third embodiment according to the present invention using a polygonal half mirror in contradistinction to first and second embodiments according to the present invention using a polygonal mirror.

FIGS. 13A and 23B are diagrams showing a horizontal angle resolution of images obtained by using a polygonal mirror. FIG. 13A shows a viewing angle of the screen 2 having viewing angle restriction means every mirror in the polygonal mirror 4a when displaying the frame image group G shown in FIG. 3, i.e., the horizontal angle resolution obtained when observed over the whole single revolution of the screen 2 having viewing angle restriction means. FIG. 13B shows the horizontal angle resolution in the case where the frame image groups G1 and G2 shown in FIG. 12 are displayed. In FIGS. 13A and 13B, the abscissa represents the angle of the direction (horizontal direction) of the screen 2 having viewing angle restriction means, and the ordinate represents brightness of a projected image.

As compared with mirrors in the polygonal mirror 4a shown in FIG. 13A, mirrors in the polygonal mirror 4a shown in FIG. 13B are shown to be narrower. Illustration like this is conducted to represent the visible ranges of projected images as a function of the screen 2 having viewing angle restriction means. As a matter of fact, it is also possible to make the mirrors in the polygonal mirror 4a shown in FIGS. 13A and 13B have equal sizes.

In the variant described with reference to FIGS. 11 and 12, a three-dimensional image can thus be displayed more finely when viewed from the periphery in the horizontal direction as compared with the first embodiment described with reference to FIGS. 2 to 4.

As heretofore described, in the first embodiment, a plurality of persons can enjoy stereoscopic images simultaneously from arbitrary directions. Adjustment of the mirrors in the polygonal mirror 4 is not necessary, and errors caused by subtle deviations in positions or directions of the mirrors can also be reduced. In addition, since the polygonal mirror 4 can be disposed near the screen 2 having viewing angle restriction means, the whole apparatus can be made small in size and a stereoscopic image can be viewed near the screen 2 having viewing angle restriction means.

Furthermore, since projected images including all frame images as shown in FIG. 3 or FIG. 12 can be always emitted from the electronic projector 5, it is not necessary to take the emission timing of each frame image into consideration. Since frame images emitted from the electronic projector 5 are projected onto the screen 2 having viewing angle restriction means and the viewer views the projected frame images, the viewer can view clear stereoscopic images from any direction and position.

In the foregoing description, the electronic projector 5 is installed over the rotation axis of the screen 2 having viewing angle restriction means to conduct projection downward. The definition of the vertical positions is used in relation to the rotation axis and the position in which the images are formed, in order to facilitate understanding. For example, the position relation between the installation place of the stereoscopic display apparatus and the floor or ceiling is not restrictive. The vertical relation may be reversed.

Figure 14:
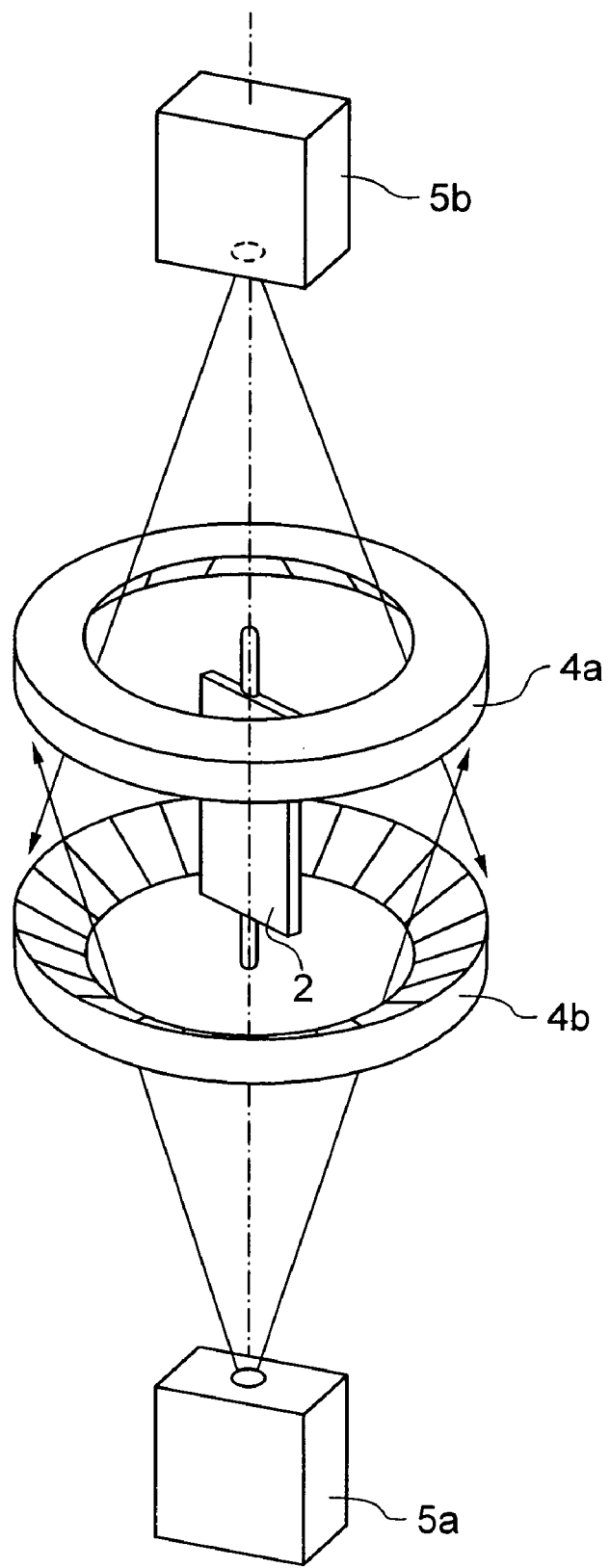
FIG. 14 is a configuration diagram showing a second embodiment of a stereoscopic display apparatus according to the present invention.

FIG. 14 is a configuration diagram showing a second embodiment of a stereoscopic display apparatus according to the present invention. In FIG. 14, 5a and 5b denote electronic projectors. Components corresponding to those shown in preceding drawings are denoted by like reference characters, and duplicated description of them will be omitted.

In the second embodiment, the polygonal mirror 4a is disposed over the screen 2 having viewing angle restriction means, and the polygonal mirror 4b is disposed under the screen 2 having viewing angle restriction means as shown in FIG. 14. Furthermore, the electronic projector 5b is disposed over the polygonal mirror 4a, and the electronic projector 5a is disposed under the polygonal mirror 4b. The polygonal mirrors 4a and 4b are ring-shaped as described above, and disposed so as to be aligned in its central axis with the rotation central axis of the screen 2 having viewing angle restriction means. As a matter of course, a plurality of mirrors included in each of the polygonal mirrors 4a and 4b are arranged on a circular cone as described above.

Figure 15A:
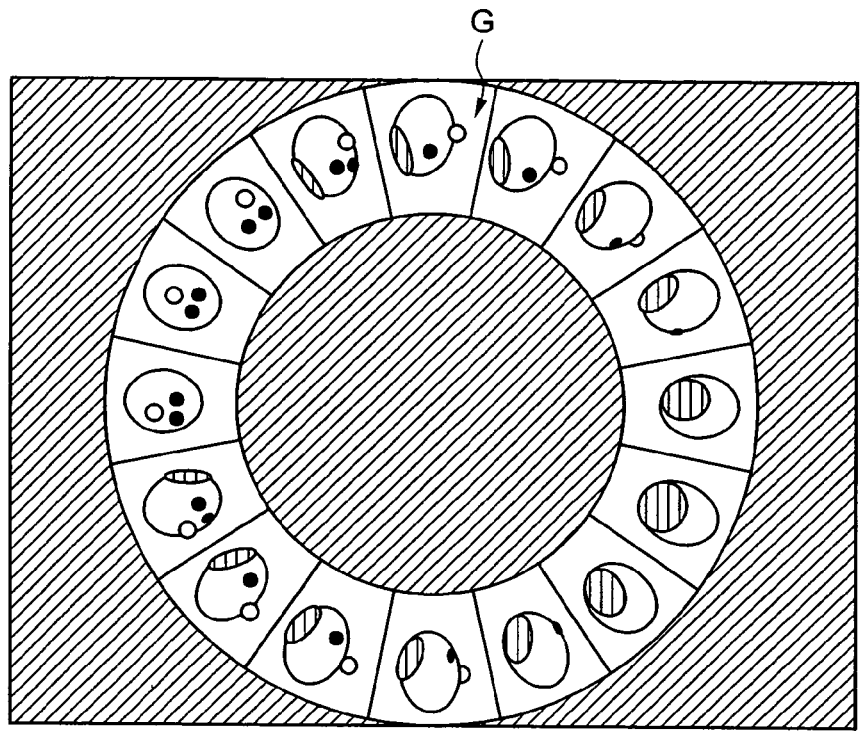
FIGS. 15A and 15B are diagrams showing one concrete example of images emitted from an electronic projector shown in FIG. 14.
Figure 15B:
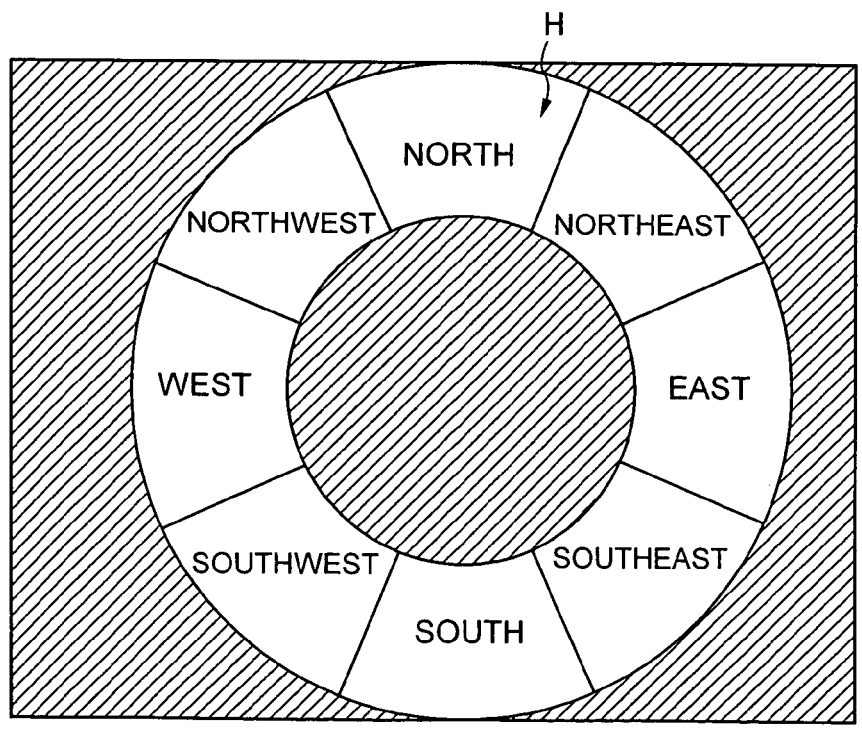

Images emitted from the lower electronic projector 5a are projected onto respective mirrors in the polygonal mirror 4a through a central opening of the lower polygonal mirror 4b, and images reflected by the mirrors are projected onto the screen 2 having viewing angle restriction means. In the same way, images emitted from the upper electronic projector 5b are projected onto respective mirrors in the polygonal mirror 4b through a central opening of the upper polygonal mirror 4a, and images reflected by the mirrors are projected onto the screen 2 having viewing angle restriction means. FIG. 15A shows one concrete example of images emitted from the lower electronic projector 5a shown in FIG. 14, and it shows images obtained by viewing the same substance from different directions around it in the same way as the frame image group G shown in FIG. 3. FIG. 15B shows one concrete example of images emitted from the upper electronic projector 5b shown in FIG. 14, and it shows images of characters representing directions in the same way as the frame image group H shown in FIG. 3.

Figure 16:
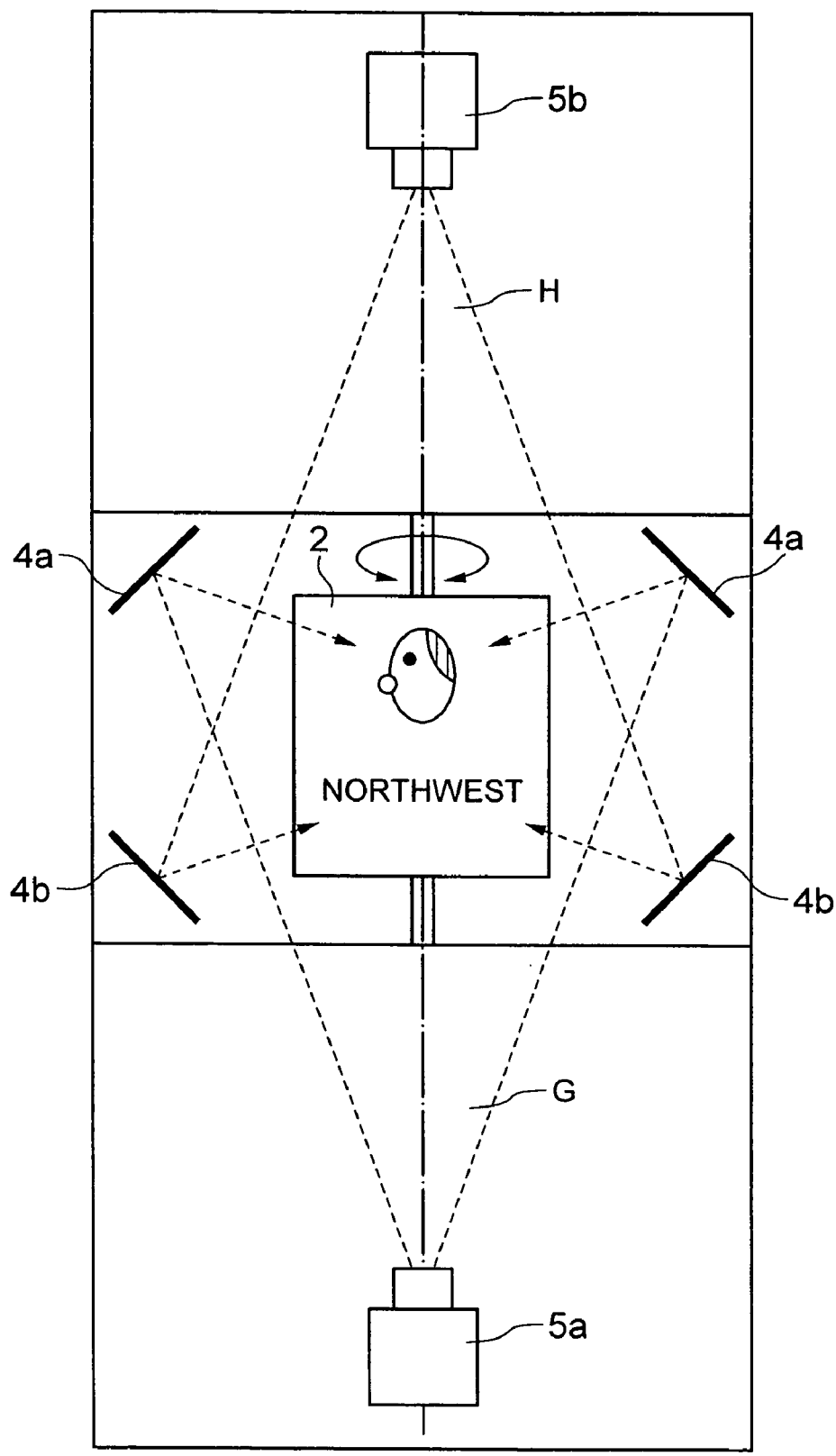
FIG. 16 is a diagram showing a state in which images shown in FIGS. 15A and 15B are projected in a second embodiment shown in FIG. 14.

FIG. 16 is a diagram showing a state in which images shown in FIGS. 15A and 15B are projected in the second embodiment shown in FIG. 14. Components corresponding to those shown in FIG. 14 are denoted by like reference characters.

In FIG. 16, images in the frame image group G shown in FIG. 15A emitted from the lower electronic projector 5a are reflected by respective mirrors in the upper polygonal mirror 4a and projected onto the screen 2 having viewing angle restriction means. Images in the frame image group H shown in FIG. 15B emitted from the upper electronic projector 5b are reflected by respective mirrors in the lower polygonal mirror 4b and projected onto the screen 2 having viewing angle restriction means. As a result, frame images in the frame image group G emitted from the electronic projector 5a are projected onto an upper side of a plane of the screen 2 having viewing angle restriction means, and frame images in the frame image group H emitted from the electronic projector 5b are projected onto a lower side of a plane of the screen 2 having viewing angle restriction means.

In the same way as the first embodiment, therefore, three-dimensional images of the substance and direction indicating images are simultaneously displayed. Every direction in viewing the screen 2 having viewing angle restriction means, the viewer can view a different aspect of the substance and information representing the direction simultaneously.

Figure 17:
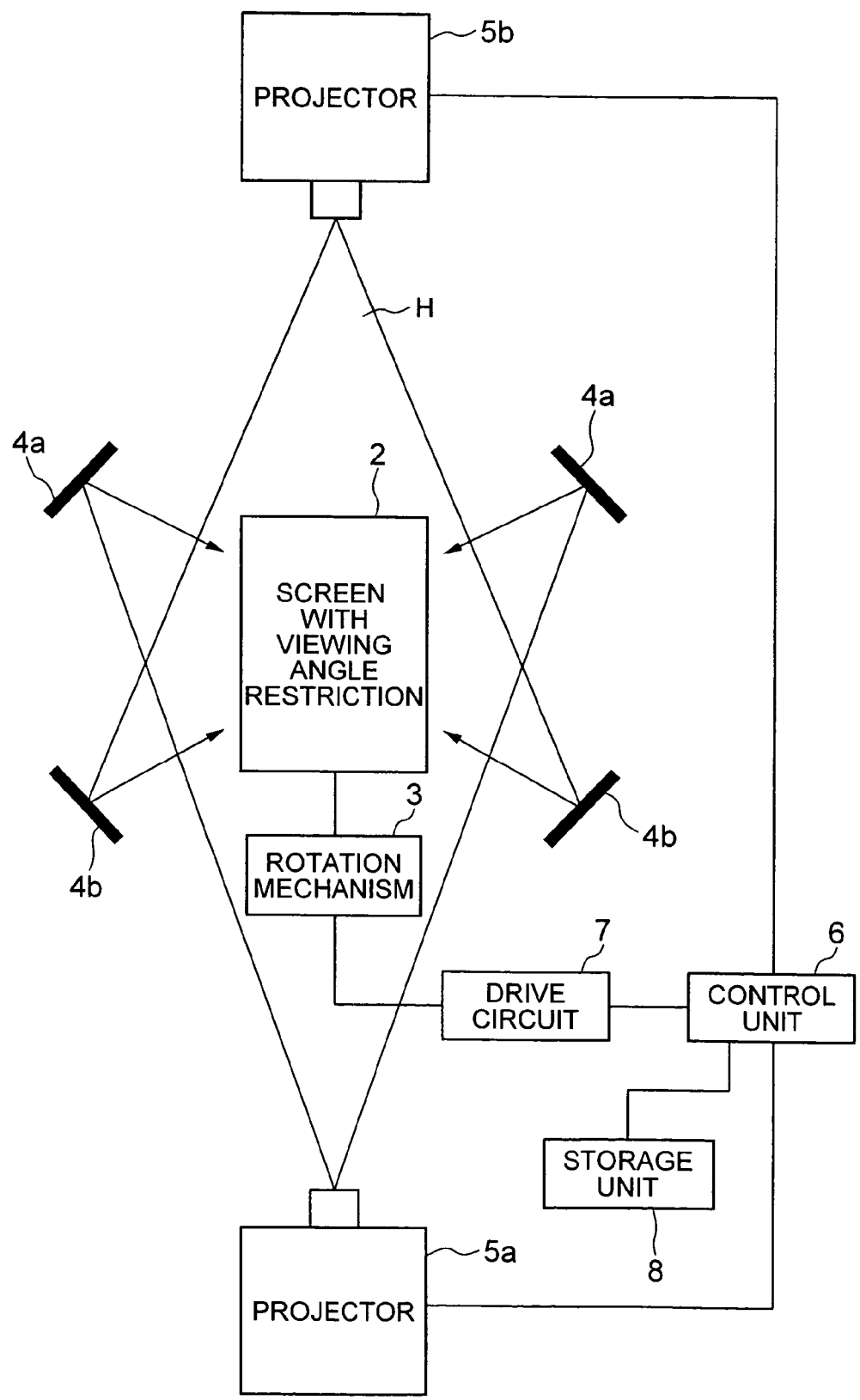
FIG. 17 is a diagram showing a system configuration of a second embodiment shown in FIG. 14.

The second embodiment is also the same in exterior view and configuration as the embodiment shown in FIG. 1. FIG. 17 is a diagram showing a system configuration of the second embodiment. Components corresponding to those shown in FIG. 16 and FIG. 5 are denoted by like reference characters.

In FIG. 17, video data representing the frame image group G shown in FIG. 15A and video data representing the frame image group H shown in FIG. 15B are stored in the storage unit 8. The control unit 6 drives the rotation mechanism unit 3 and rotates the screen 2 having viewing angle restriction means by controlling the drive circuit 7. Furthermore, the control unit 6 reads out these video data from the storage unit 8, supplies the video data representing the frame image group G to the electronic projector 5a, supplies the video data representing the frame image group H to the electronic projector 5b, and projects the frame image groups G and H onto the screen 2 having viewing angle restriction means as shown in FIG. 16. The video data representing the frame image group G and the video data representing the frame image group H may be generated arbitrarily by using computer graphics or the like, or may be generated by picking up images with a CCD camera. In the case where images are picked up with a CCD camera to generate the video data, it is also possible to conduct the generation in a remote place, receive the generated video data, and store the video data in the storage unit 8.

Figure 18A:
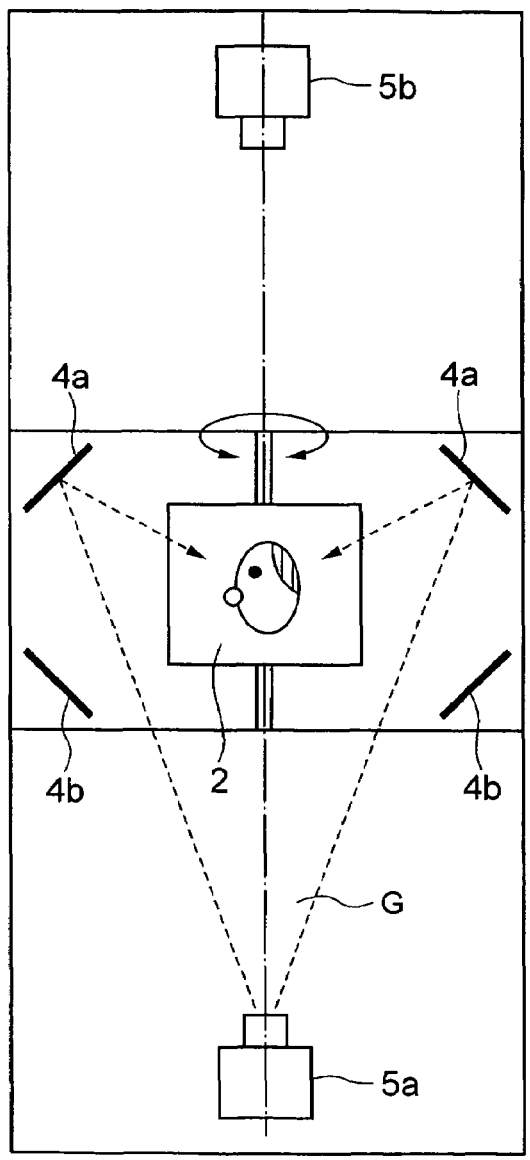
FIGS. 18A and 18B are configuration diagrams showing one variant of a second embodiment shown in FIG. 14.
Figure 18B:
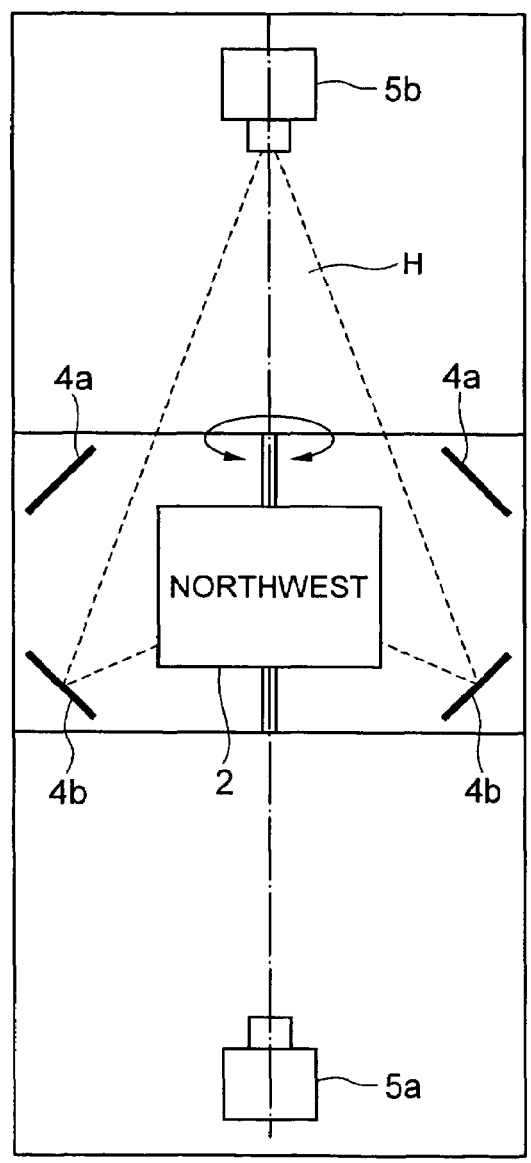

FIGS. 18A and 18B are configuration diagrams showing one variant of the second embodiment shown in FIG. 14. Components corresponding to those shown in FIG. 14 are denoted by like reference characters, and duplicated description of them will be omitted.

In this variant, either the frame image group G or the frame image group H is selectively displayed.

FIG. 18A shows the case where the frame image group G is displayed. In this case, the frame image group G shown in FIG. 15A is emitted from the electronic projector 5a, and the electronic projector 5b is brought into the stop state. The emitted images in the frame image group G are reflected by respective mirrors in the polygonal mirror 4a, and projected onto the screen 2 having viewing angle restriction means. As a result, three-dimensional images of the substance using the frame image group G are displayed on the screen 2 having viewing angle restriction means.

FIG. 18B shows the case where the frame image group H is displayed. In this case, the frame image group H shown in FIG. 15B is emitted from the electronic projector 5b, and the electronic projector 5a is brought into the stop state. The emitted images in the frame image group H are reflected by respective mirrors in the polygonal mirror 4b, and projected onto the screen 2 having viewing angle restriction means. As a result, images representing directions are displayed by using the frame image group H.

Projection positions of the frame image group G in the case of FIG. 18A and projection positions of the frame image group H in the case of FIG. 18B on the screen 2 having viewing angle restriction means may be the same or may be different.

Furthermore, in this variant, either the display state shown in FIG. 18A or the display state shown in FIG. 18B may be selected according to the installation place of the stereoscopic display apparatus. Or the display state shown in FIG. 18A and the display state shown in FIG. 18B may be used properly irrespective of the installation place. (For example, it is also possible to display images in the frame image group H and make the stereoscopic display apparatus function as a direction display apparatus when the viewer is at least a predetermined distance away, and display three-dimensional images of the substance in the frame image group G when the viewer is within the predetermined distance.)

Figure 19:
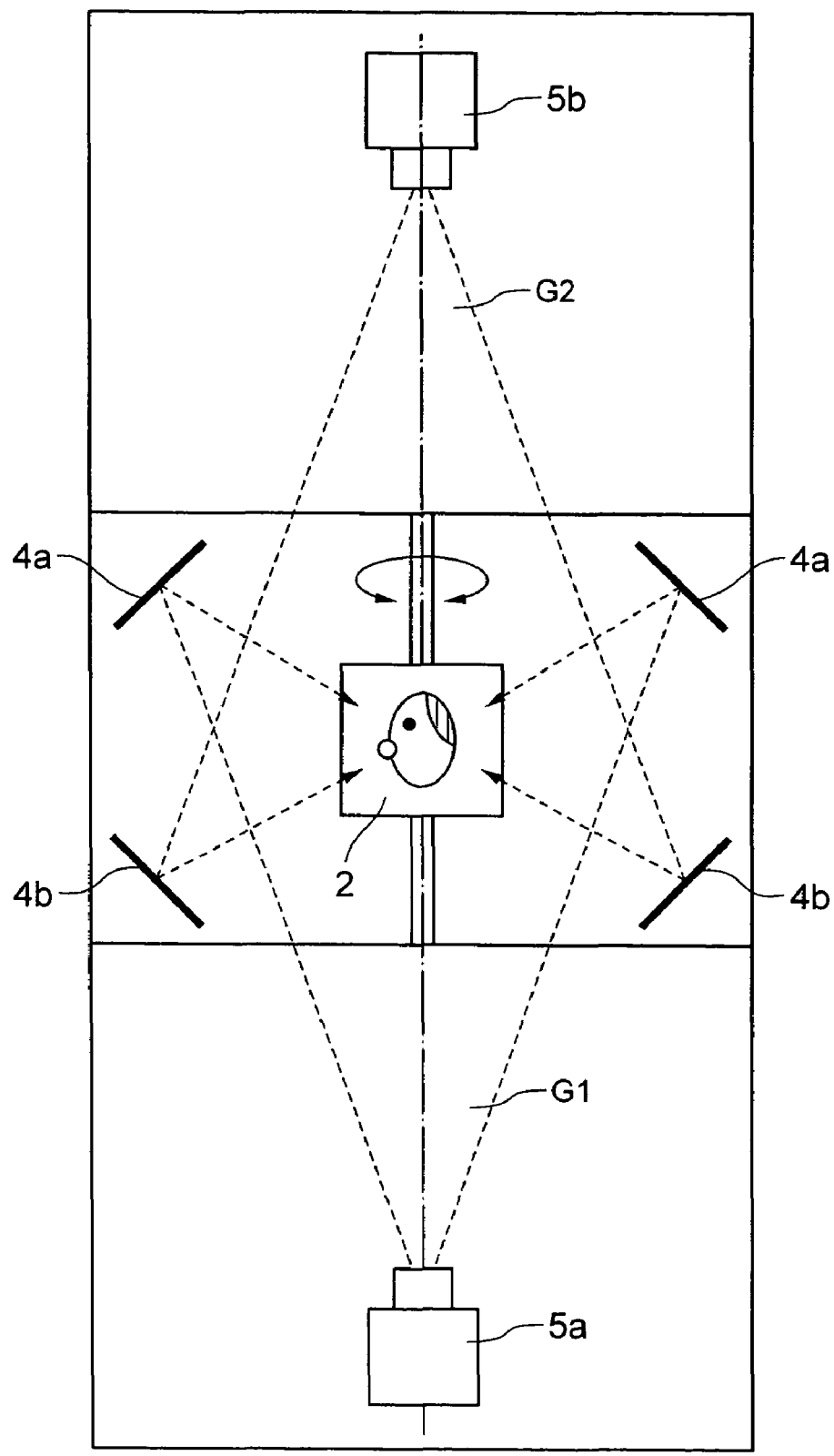
FIG. 19 is a configuration diagram showing another variant of a second embodiment shown in FIG. 14.

FIG. 19 is a configuration diagram showing another variant of the second embodiment shown in FIG. 14. Components corresponding to those shown in FIG. 14 are denoted by like reference characters, and duplicated description of them will be omitted.

This variant is adapted to display frame image groups G1 and G2 of the same substance.

Figure 20A:
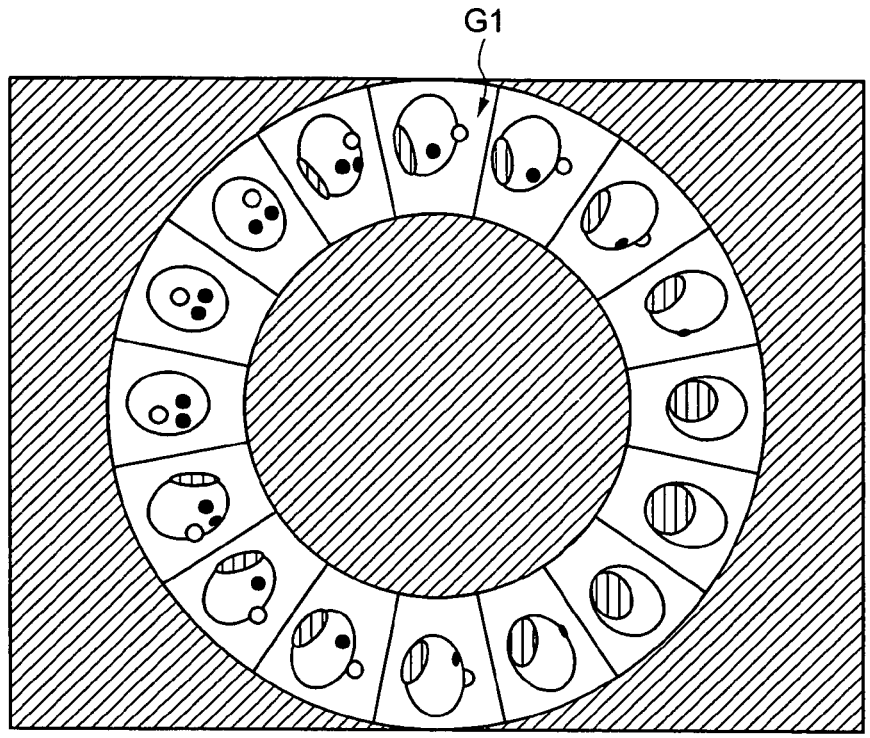
FIGS. 20A and 20B are diagrams showing frame images emitted from an electronic projector shown in FIG. 19.
Figure 20B:
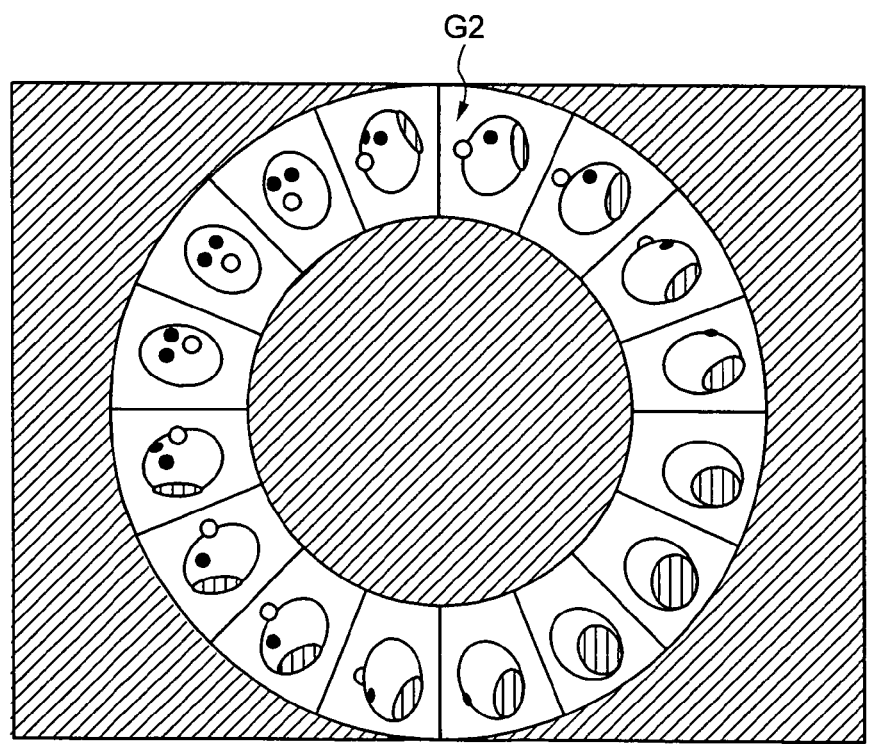

In FIG. 19, the electronic projector 5a emits the frame image group G1 shown in FIG. 20A, and the electronic projector 5b emits the frame image group G2 shown in FIG. 20B. The frame image groups G1 and G2 are obtained from the same substance, and they correspond to the frame image groups G1 and G2 in the video data shown in FIG. 12 and used in the variant of the first embodiment.

Images in the frame image group G1 emitted from the electronic projector 5a are reflected by respective mirrors in the polygonal mirror 4a, and projected onto the screen 2 having viewing angle restriction means. In the same way, images in the frame image group G2 emitted from the electronic projector 5b are reflected by respective mirrors in the polygonal mirror 4b, and projected onto the screen 2 having viewing angle restriction means. Positions and inclinations of the polygonal mirrors 4a and 4b are set so as to make the projection position and size of the frame image group G1 the same as the projection position and size of the frame image group G2 on the screen 2 having viewing angle restriction means.

Position relations between mirrors in the polygonal mirror 4a and mirrors in the polygonal mirror 4b and disposition relations between video data in the frame image groups G1 and video data in the frame image group G2 respectively emitted by the electronic projectors 5a and 5b are set so as to alternately project the frame image group G1 and the frame image group G2 on planes of the screen 2 having viewing angle restriction means as the screen 2 having viewing angle restriction means rotates. For example, when projecting the frame image groups G1 and G2 respectively shown in FIGS. 20A and 20B onto the screen 2 having viewing angle restriction means, the number of all frame images is equal to 16×2=32. Each time the screen 2 having viewing angle restriction means rotates by 360°÷32=11.25°, the frame image group G1 and the frame image group G2 are displayed alternately. Therefore, mirrors in the polygonal mirrors 4a and 4b are arranged so as to make the planes of the screen 2 having viewing angle restriction means parallel alternately to a mirror in the polygonal mirror 4a and a mirror in the polygonal mirror 4b, each time the screen 2 having viewing angle restriction means rotates by 11.25°. The electronic projectors 5a and 5b respectively emit the frame image groups G1 and G2 so as to display the frame image group G2 by using the mirrors in the polygonal mirror 4b as images obtained by viewing the same substance from directions deviated by 11.25° as compared with the frame image group G1 reflected by the adjacent polygonal mirror 4a.

In this way, three-dimensional images similar to those in the variant of the first embodiment described with reference to FIGS. 11 and 12 are displayed. In the variant shown in FIGS. 19, 20A and 20B, however, the frame image groups G1 and G2 are emitted with the same size respectively from the electronic projectors 5a and 5b as shown in FIGS. 20A and 20B. Therefore, the frame image groups G1 and G2 can be displayed as images having the same resolution. When the viewer views the three-dimensional image displayed on the screen 2 having viewing angle restriction means while moving around the stereoscopic display apparatus, the viewer can view an image having a uniform picture quality as a whole. Especially as compared with the variant of the first embodiment described with reference to FIGS. 11 and 12, the frame image group G1 is displayed on the full screen of the electronic projector 5a, and in addition the frame image group G2 is also displayed on the full screen of the electronic projector 5b. As a whole, therefore, a three-dimensional image improved in picture quality can be obtained.

In the second embodiment and its variant heretofore described, the electronic projector 5a which emits the frame image group G or G1 and the electronic projector 5b which emits the frame image group H or G2 may be reversed in the vertical direction and disposed.

Figure 21:
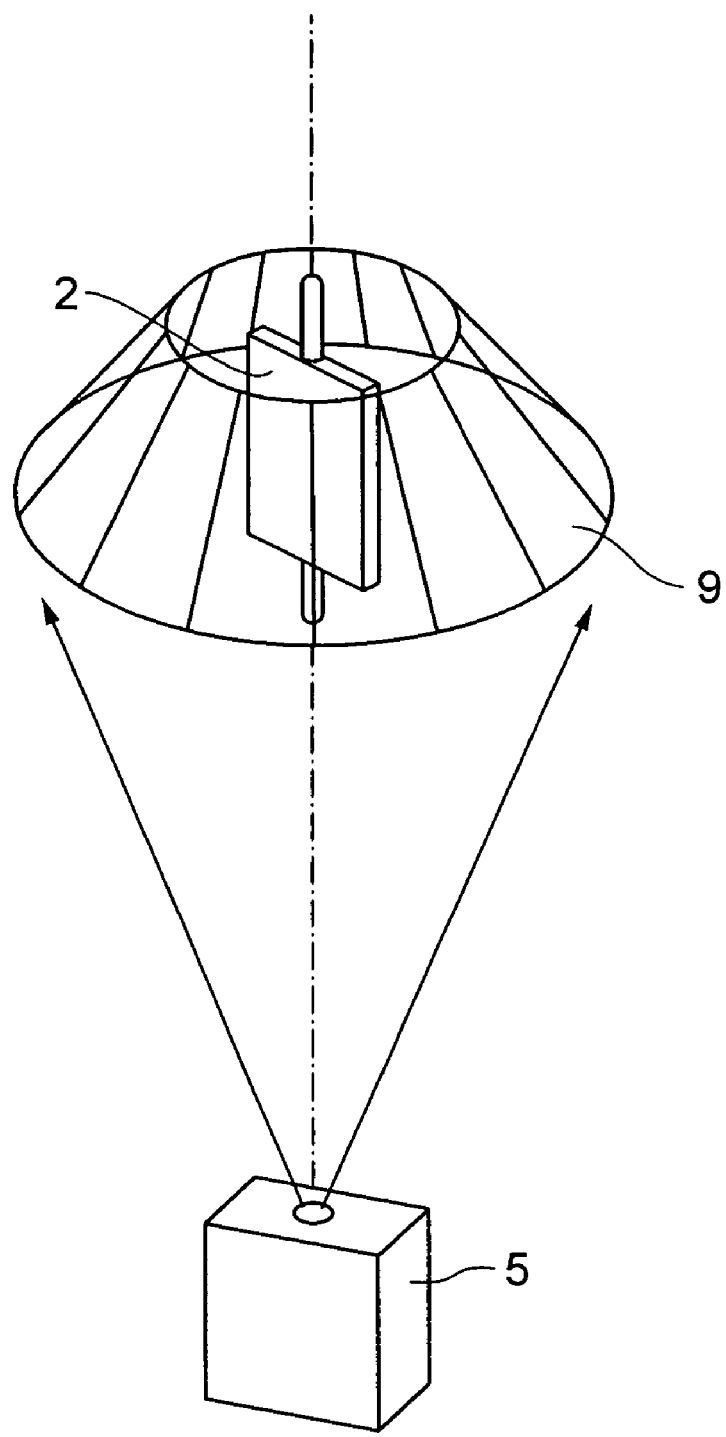
FIG. 21 is a configuration diagram showing a principal part of a third embodiment of a stereoscopic display apparatus according to the present invention.

FIG. 21 is a configuration diagram showing a principal part of a third embodiment of a stereoscopic display apparatus according to the present invention. Reference numeral 9 denotes a polygonal half mirror. Components corresponding to those shown in preceding drawings are denoted by like reference characters, and duplicated description of them will be omitted.

In the third embodiment, the polygonal half mirror 9 including a plurality of half mirrors is used instead of the polygonal mirror 4 in the preceding embodiments. Parts of frame images emitted from the electronic projector 5 are reflected by respective half mirrors in the polygonal half mirror 9, and projected onto the screen 2 having viewing angle restriction means. In this way, a three-dimensional image using frame images is displayed on each of planes of the screen 2 having viewing angle restriction means in the same way as the foregoing embodiments. The viewer can view the three-dimensional image through the polygonal half mirror 9.

The electronic projector 5 emits, for example, images including the frame image groups G and H as shown in FIG. 3. The half mirrors in the polygonal half mirror 9 are arranged along the same circular locus on the same circular cone (not illustrated) so as to reflect the frame image groups G and H and project them onto the screen 2 having viewing angle restriction means.

Figure 22:
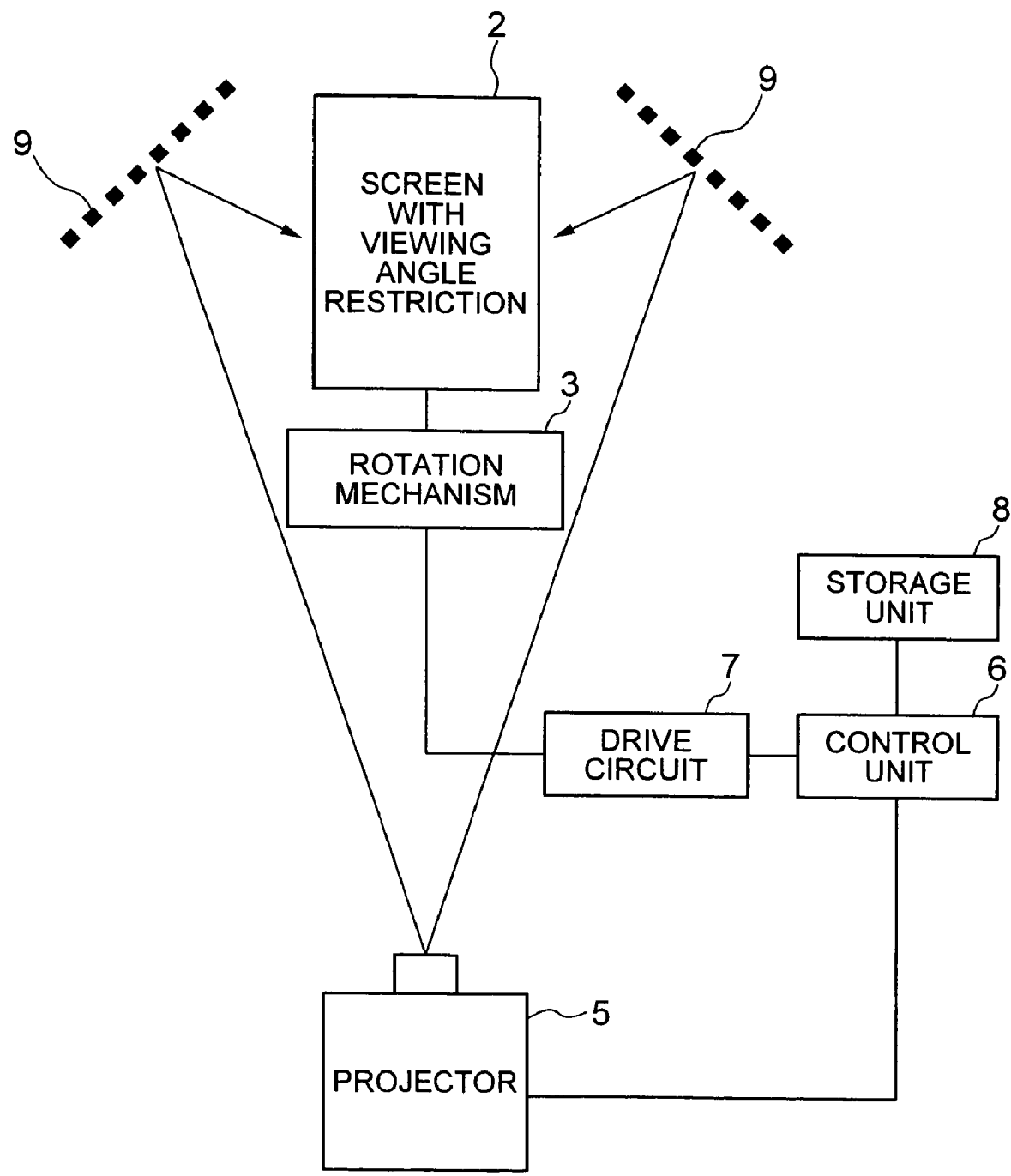
FIG. 22 is a diagram showing a system configuration of a third embodiment shown in FIG. 21.

FIG. 22 is a diagram showing a system configuration of the third embodiment shown in FIG. 21. Components corresponding to those shown in FIGS. 5 and 21 are denoted by like reference characters.

In FIG. 22, video data representing the frame image groups G and H shown in FIG. 3 are stored in the storage unit 8. The control unit 6 drives the rotation mechanism unit 3 and rotates the screen 2 having viewing angle restriction means by controlling the drive circuit 7. Furthermore, the control unit 6 reads out the video data from the storage unit 8, supplies the video data to the electronic projector 5, and projects the frame image groups G and H onto the screen 2 having viewing angle restriction means. The video data representing the frame image groups G and H may be generated arbitrarily by using computer graphics or the like, or may be generated by picking up images with a CCD camera. In the case where images are picked up with a CCD camera to generate the video data, it is also possible to conduct the generation in a remote place, receive the generated video data, and store the video data in the storage unit 8.

FIGS. 23A and 23B are diagrams showing the third embodiment according to the present invention using the polygonal half mirror shown in FIGS. 21 and 22 in contra-distinction to the first and second embodiments using the polygonal mirror. S, S1 and S2 denote visions, and L denotes an optical axis. FIG. 23A shows the case where a polygonal half mirror is used, whereas FIG. 23B shows the case where a polygonal mirror is used.

In the case of FIG. 23B using the polygonal mirror 4, the viewer avoids the visions S1 and S2 from the polygonal mirror 4, and views a frame image displayed on a plane of the screen 2 having viewing angle restriction means. Therefore, these visions S1 and S2 do not coincide with the optical axis L of light rays of frame images projected onto the screen 2 having viewing angle restriction means at all. In other words, parallax occurs.

On the other hand, in the case of the third embodiment shown in FIG. 23A using the polygonal half mirror 9, light of frame images reflected by the screen 2 having viewing angle restriction means passes through respective half mirrors in the polygonal half mirror 9. The viewer can view a three-dimensional image displayed on a plane of the screen 2 having viewing angle restriction means, through the polygonal half mirror 9. When the viewer views this image, therefore, it is possible to make the vision S nearly coincide with the optical axis L of the light rays of frame images reflected by the polygonal half mirror 9 and projected onto the screen 2 having viewing angle restriction means. In other words, parallax occurs little.

In the case of FIG. 23A, frame images from the electronic projector 5 are reflected by respective half mirrors in the polygonal half mirror 9 and projected onto the screen 2 having viewing angle restriction means. Equivalently, a pseudo electronic projector 5 is present on an extended line of the optical axis L located outside the polygonal half mirror 9, and this frame image is emitted from this pseudo electronic projector and projected onto the screen 2 having viewing angle restriction means. If the vision S of the viewer almost coincides with the light ray L and there is little parallax, it is meant that the viewer views a frame image displayed on a plane of the screen 2 having viewing angle restriction means from the direction of the pseudo electronic projector.

Figure 24:
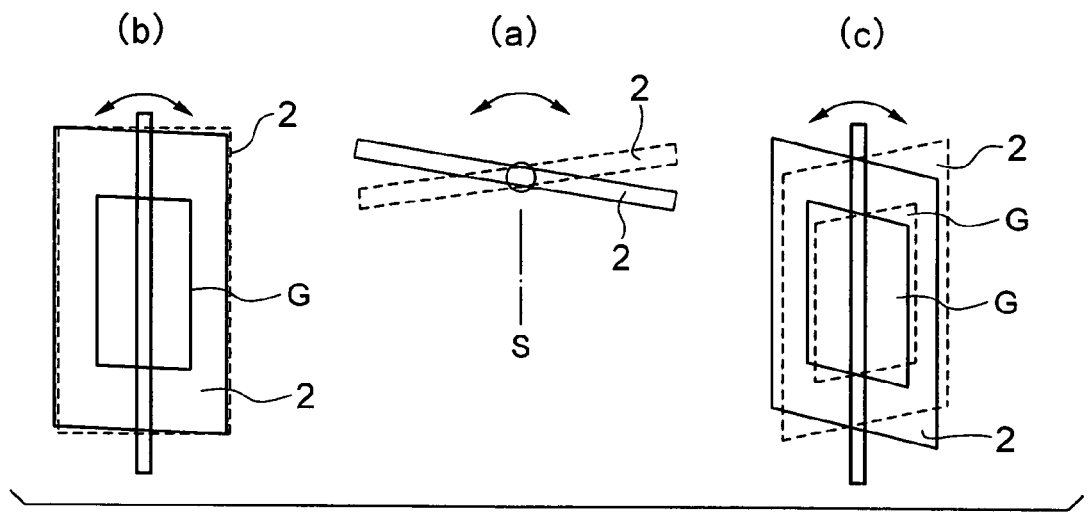
FIG. 24 is a diagram showing a change of a frame image displayed on a plane of a screen having viewing angle restriction means caused by rotation of the screen having viewing angle restriction means in a third embodiment shown in FIG. 21.

FIG. 24 is a diagram showing a change of the frame image group G displayed on planes of the screen 2 having viewing angle restriction means caused by rotation of the screen 2 having viewing angle restriction means.

FIG. 24(a) shows states before and after a state in which the screen 2 having viewing angle restriction means which rotates with respect to the vision S of the viewer faces to the front. In FIG. 24(a), the screen 2 having viewing angle restriction means indicated by a solid line represents a state before the screen 2 faces to the front, whereas the screen 2 having viewing angle restriction means indicated by a broken line represents a state after the screen 2 faces to the front. The same is true of FIG. 24(b) and (c) as well. FIG. 24(b) shows a change of the frame image group G displayed on a plane of the screen 2 having viewing angle restriction means in the case where there is little parallax as shown in FIG. 23A. FIG. 24(c) shows a change of the frame image group G displayed on the plane of the screen 2 having viewing angle restriction means when the viewer views the plane of the screen 2 having viewing angle restriction means so as to look down at it as compared with the optical axis L as shown in FIG. 23B (the vision becomes S1 as compared with the optical axis).

Even if the screen 2 having viewing angle restriction means is rotated as shown in FIG. 24(a) when the vision S nearly coincides with the optical axis L and there is little parallax as shown in FIG. 23A, the frame image group G displayed on the screen 2 having viewing angle restriction means changes little in size, position and shape, and little blurring is caused by rotation of the screen 2 having viewing angle restriction means.

On the other hand, when the viewer views the frame image group G displayed on a plane of the screen 2 having viewing angle restriction means so as to look down with downward vision S1 as compared with the optical axis L as shown in FIG. 23B, the frame image group G displayed on the screen 2 having viewing angle restriction means looks as if its shape has changed as shown in FIG. 24(*c*) and blurring caused by the rotation of the screen 2 having viewing angle restriction means appears.

Figure 25:
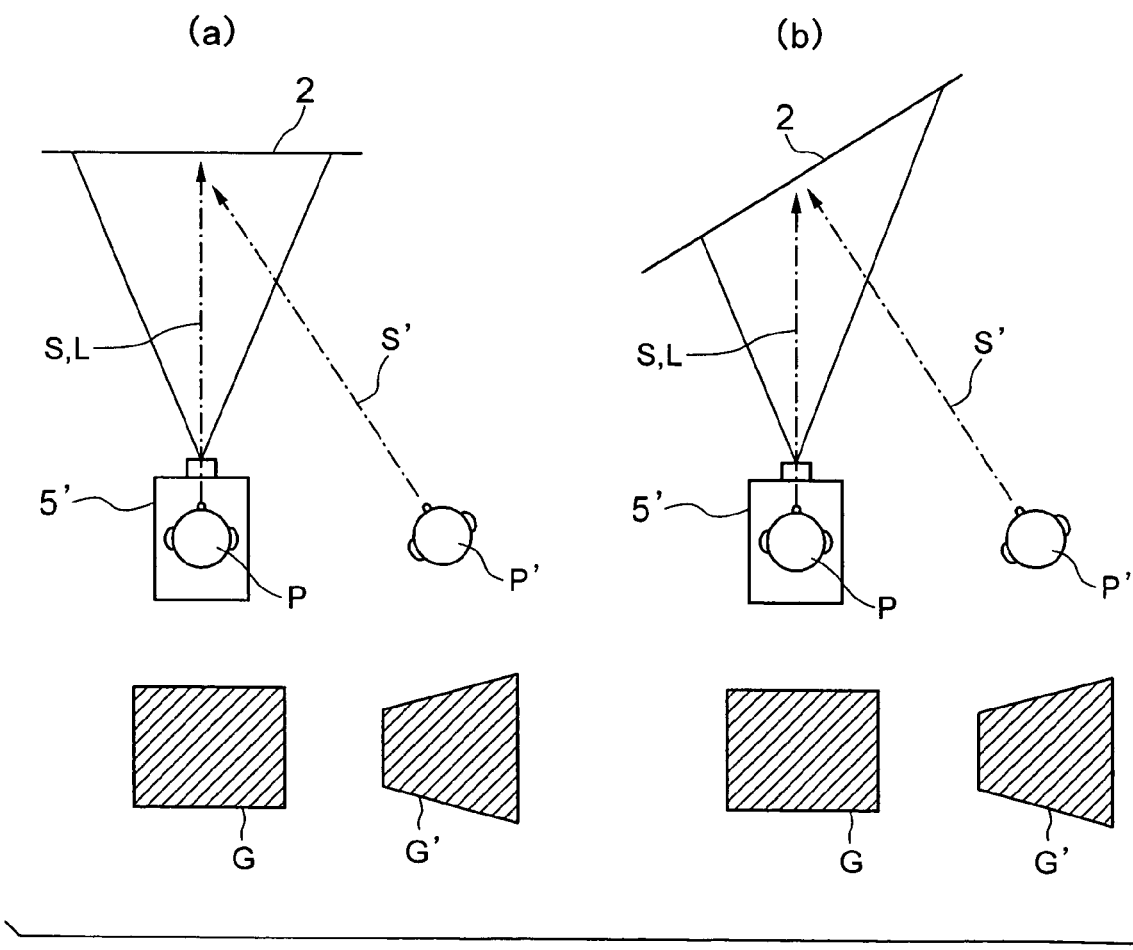
FIG. 25 is a diagram showing how a frame image looks in the case where there is no parallax and in the case where vision deviates from the optical axis in the horizontal direction in a third embodiment shown in FIG. 21.

FIG. 25 is a diagram showing how a frame image looks in the case where there is no parallax and in the case where vision deviates from the optical axis L in the horizontal direction. FIG. 25(*a*) shows a state in which a plane of the screen 2 having viewing angle restriction means faces to the front of the pseudo electronic projector 5', whereas FIG. 25(*b*) shows a state in which the screen 2 having viewing angle restriction means is rotated from the state shown in FIG. 25(*a*).

If there is little parallax when a viewer P views a plane of the screen 2 having viewing angle restriction means from a direction of the pseudo electronic projector 5', the frame image group G viewed by the viewer P changes in neither size nor shape and blurring is not caused in the frame image group G, irrespective of whether the plane of the screen 2 having viewing angle restriction means faces to the front of the viewer P or the plane is rotated to become oblique to the viewer P as shown in FIGS. 25(*a*) and (*b*). On the other hand, even when a viewer is in a position shifted in a certain range from the position of the viewer P in the horizontal direction, the viewer can view the screen 2 having viewing angle restriction means in the same state. As for the viewer P' in such a position, however, its vision S' is inclined with respect to the optical axis L in the horizontal direction. Therefore, a frame image group G' displayed on the screen 2 having viewing angle restriction means and viewed by the viewer P' changes in shape as the screen 2 having viewing angle restriction means is rotated. Accordingly, blurring is caused in the frame image group G' as the screen 2 having viewing angle restriction means is rotated.

In the third embodiment, it is thus possible to view a frame image displayed on a plane of the screen 2 having viewing angle restriction means through the polygonal half mirror 9. Therefore, the frame image can be viewed so as not to cause blurring when the screen 2 having viewing angle restriction means is rotated.

The third embodiment also has the exterior view and configuration shown in FIG. 1.

Figure 26:
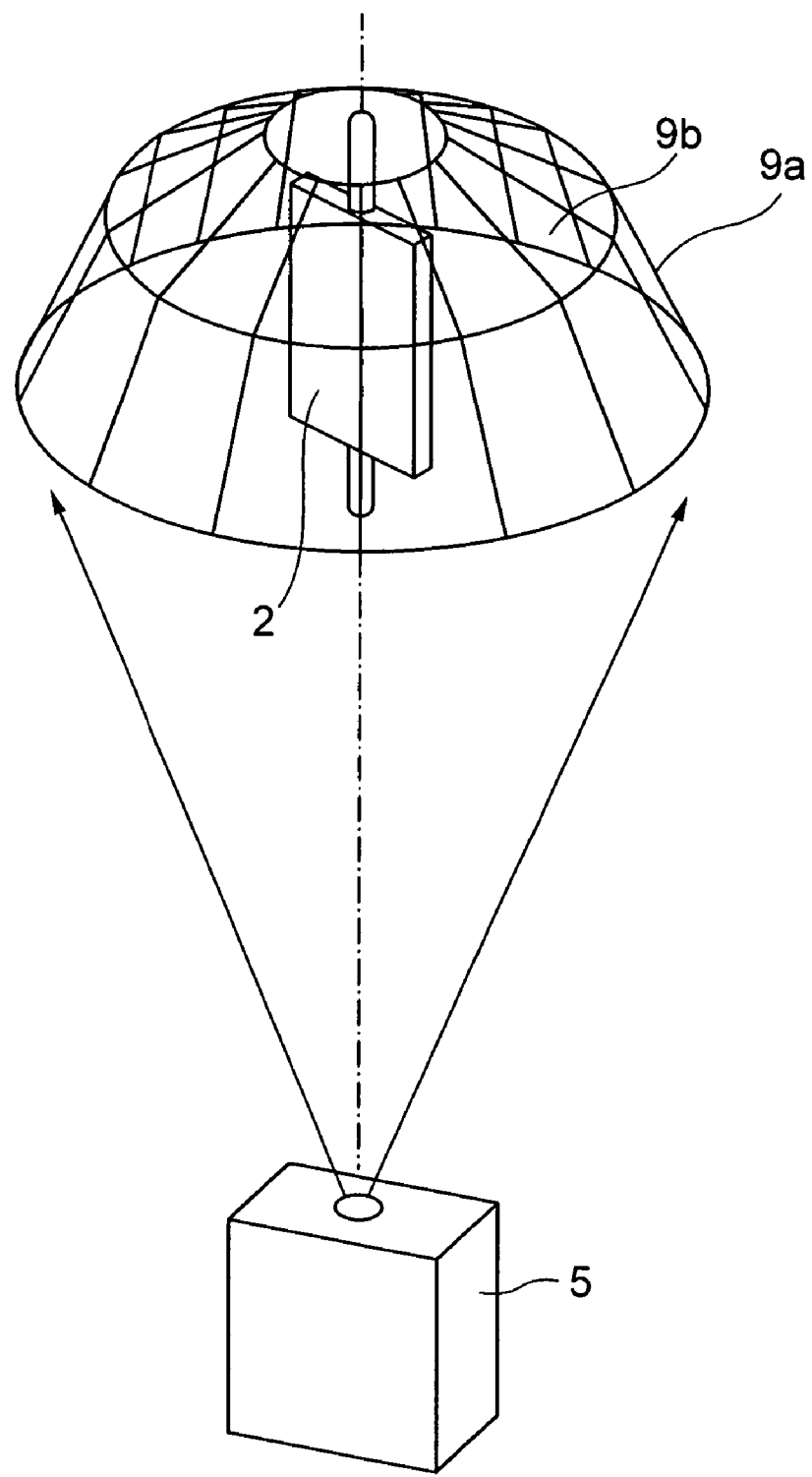
FIG. 26 is a configuration diagram showing a principal part of a fourth embodiment of a stereoscopic display apparatus according to the present invention.

FIG. 26 is a configuration diagram showing a principal part of a fourth embodiment of a stereoscopic display apparatus according to the present invention. In FIG. 26, 9*a* and 9*b* denote polygonal half mirrors. Components corresponding to those shown in preceding drawings are denoted by like reference characters, and duplicated description of them will be omitted.

In the fourth embodiment, two polygonal half mirrors 9*a* and 9*b* are arranged in a concentric form respectively on the upper side and the lower side as shown in FIG. 26. Each of the polygonal half mirrors 9*a* and 9*b* includes a plurality of half mirrors. Images including two sets of frame images for the same substance are emitted from the electronic projector 5. One set of frame images are reflected by half mirrors in the polygonal half mirror 9*a* and projected onto the screen 2 having viewing angle restriction means. The other set of frame images are reflected by half mirrors in the polygonal half mirror 9*b* and projected onto the screen 2 having viewing angle restriction means.

Figure 27:
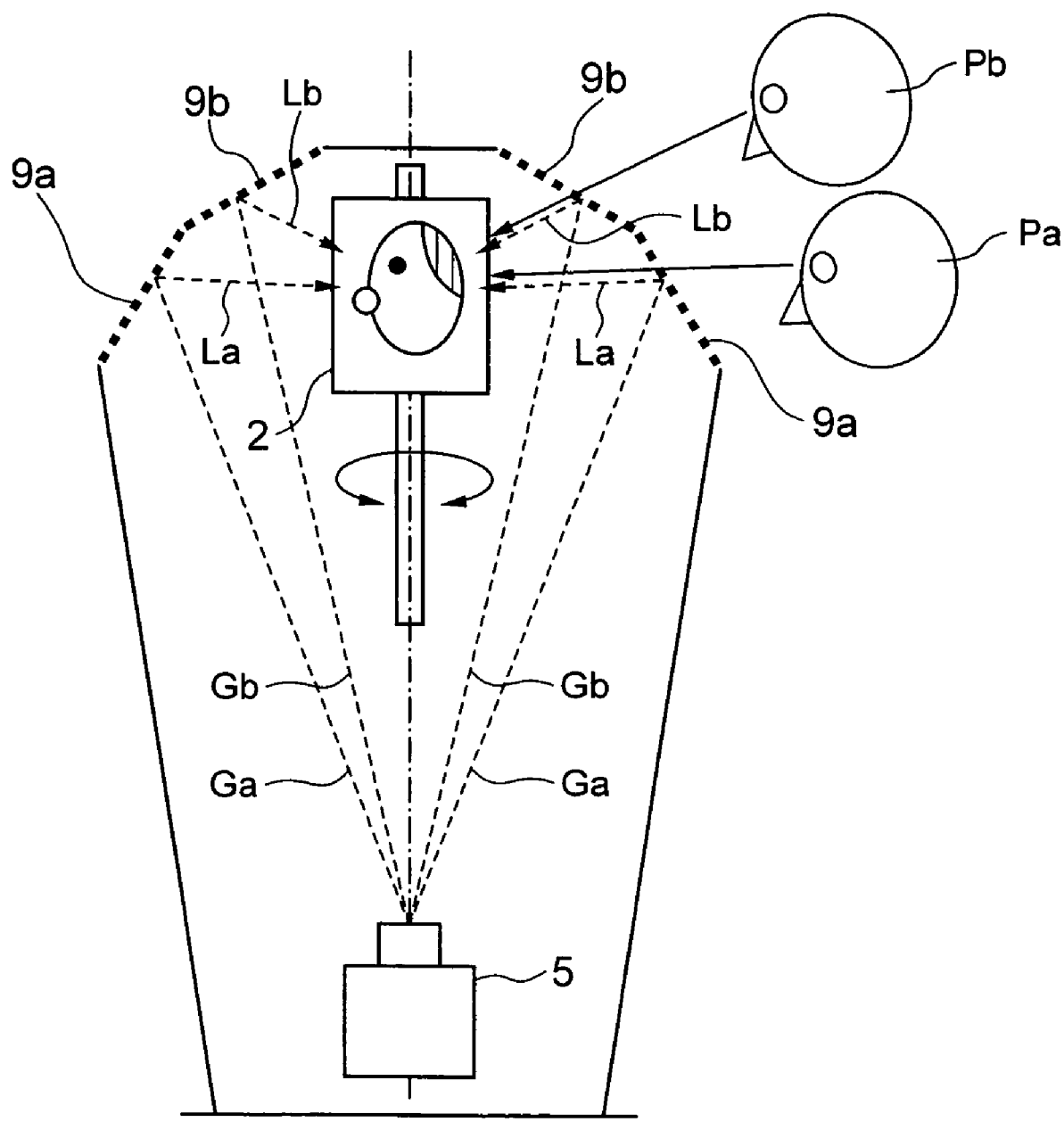
FIG. 27 is a diagram showing a projection state and how a viewer views a frame image in a fourth embodiment shown in FIG. 26.
Figure 28:
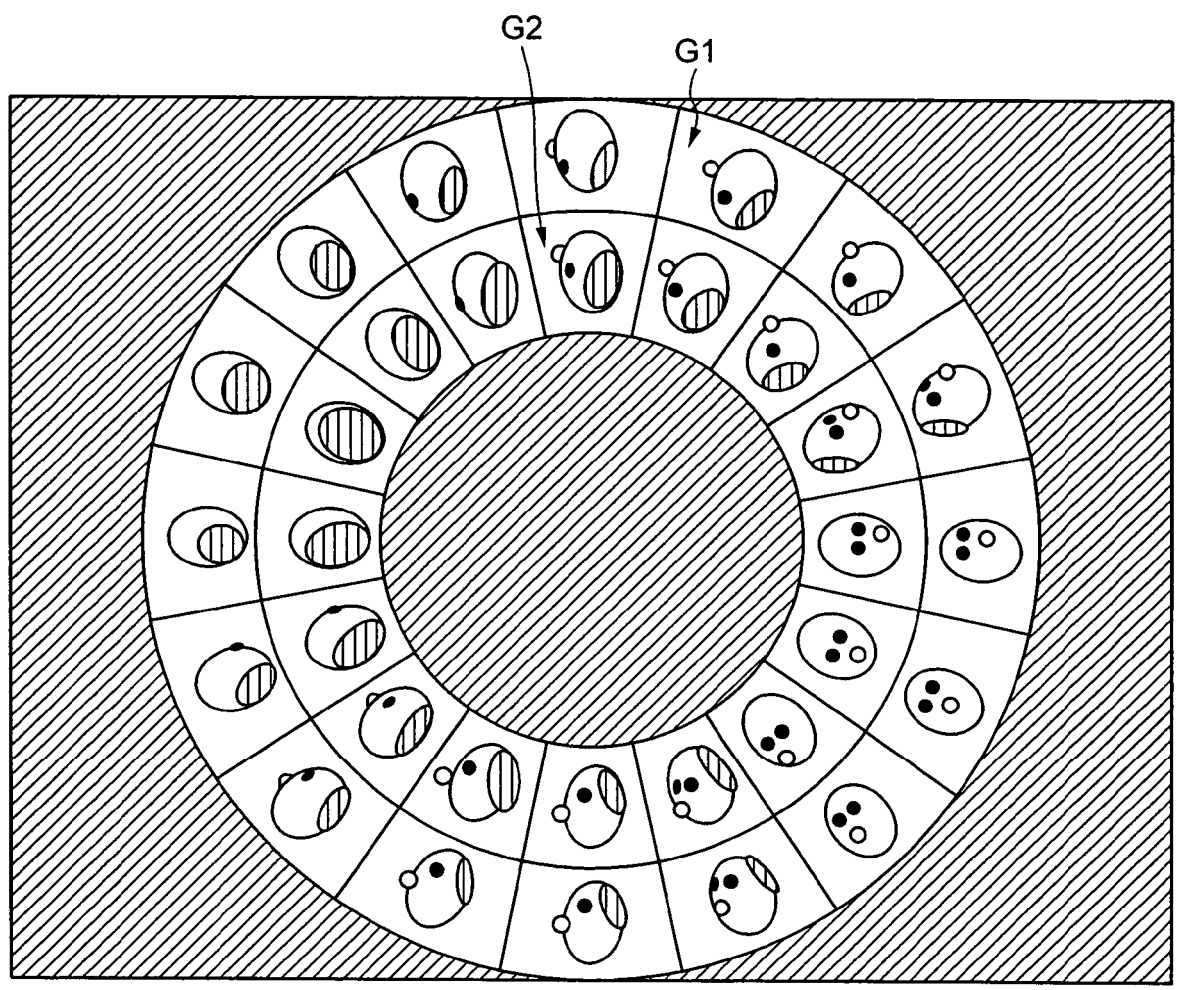
FIG. 28 is a diagram showing frame images emitted from an electronic projector in a fourth embodiment shown in FIG. 26.

FIG. 27 is a diagram showing its projection state and how a viewer views frame images. Images including two frame image groups G1 and G2 are emitted from the electronic projector 5 as shown in FIG. 28. Here, the frame image group G1 includes images obtained when a substance is viewed from respective directions around the substance. The frame image group G2 includes images obtained when an upper side of the same substance than the frame image group G1 is viewed from respective directions around the substance. The number of frames in the frame image group G1 may be equal to or different from the number of frames in the frame image group G2.

In FIG. 27, the frame images in the frame image group G1 emitted from the electronic projector 5 are reflected by respective half mirrors in the polygonal half mirror 9*a* and projected onto the screen 2 having viewing angle restriction means. The frame images in the frame image group G2 emitted from the electronic projector 5 are also reflected by respective half mirrors in the polygonal half mirror 9*b* and projected onto the screen 2 having viewing angle restriction means in the same positions as those for the frame image group G1.

Here, as for each of frame images in the frame image group G1 reflected by the half mirrors in the polygonal half mirror 9*a* and projected onto the screen 2 having viewing angle restriction means, its projection light La is reflected in its projection direction. As for each of frame images in the frame image group G2 reflected by the half mirrors in the polygonal half mirror 9*b* and projected onto the screen 2 having viewing angle restriction means, its projection light Lb is reflected in its projection direction. Therefore, the frame image groups G1 and G2 are viewed through the polygonal half mirrors 9*a* and 9*b*. Only a viewer Pa who views from such a direction that vision nearly coincides with the projection light La of the frame image group G1 can view the frame image group G1 displayed on a plane of the screen 2 having viewing angle restriction means. If a viewer Pb views the screen 2 having viewing angle restriction means through the polygonal half mirror 9*b*, vision of the viewer Pb deviates largely from the projection light La of the frame image group G1 and consequently the viewer Pb cannot view the frame image group G1. Only a viewer Pb who views from such a direction that vision nearly coincides with the projection light Lb of the frame image group G2 can view the frame image group G2 displayed on a plane of the screen 2 having viewing angle restriction means. If a viewer Pa views the screen 2 having viewing angle restriction means through the polygonal half mirror 9*a*, vision of the viewer Pa deviates largely from the projection light Lb of the frame image group G2 and consequently the viewer Pa cannot view the frame image group G2.

On the other hand, the viewer Pa can view aspect images around the substance stereoscopically by viewing the frame image group G1 projected on the screen 2 having viewing angle restriction means through the polygonal half mirror 9*a*. In addition, if the viewer Pa views the screen 2 having viewing angle restriction means through the polygonal half mirror 9*b*, the viewer Pa can stereoscopically view the frame image group G2 as an image of a portion viewed from a higher place as compared with the aspect of the same substance associated with the frame image group G1.

Thus, in the fourth embodiment, aspects around a stereoscopic image in the horizontal direction can be viewed, and in addition, aspects in the vertical direction can also be viewed partially.

Figure 29:
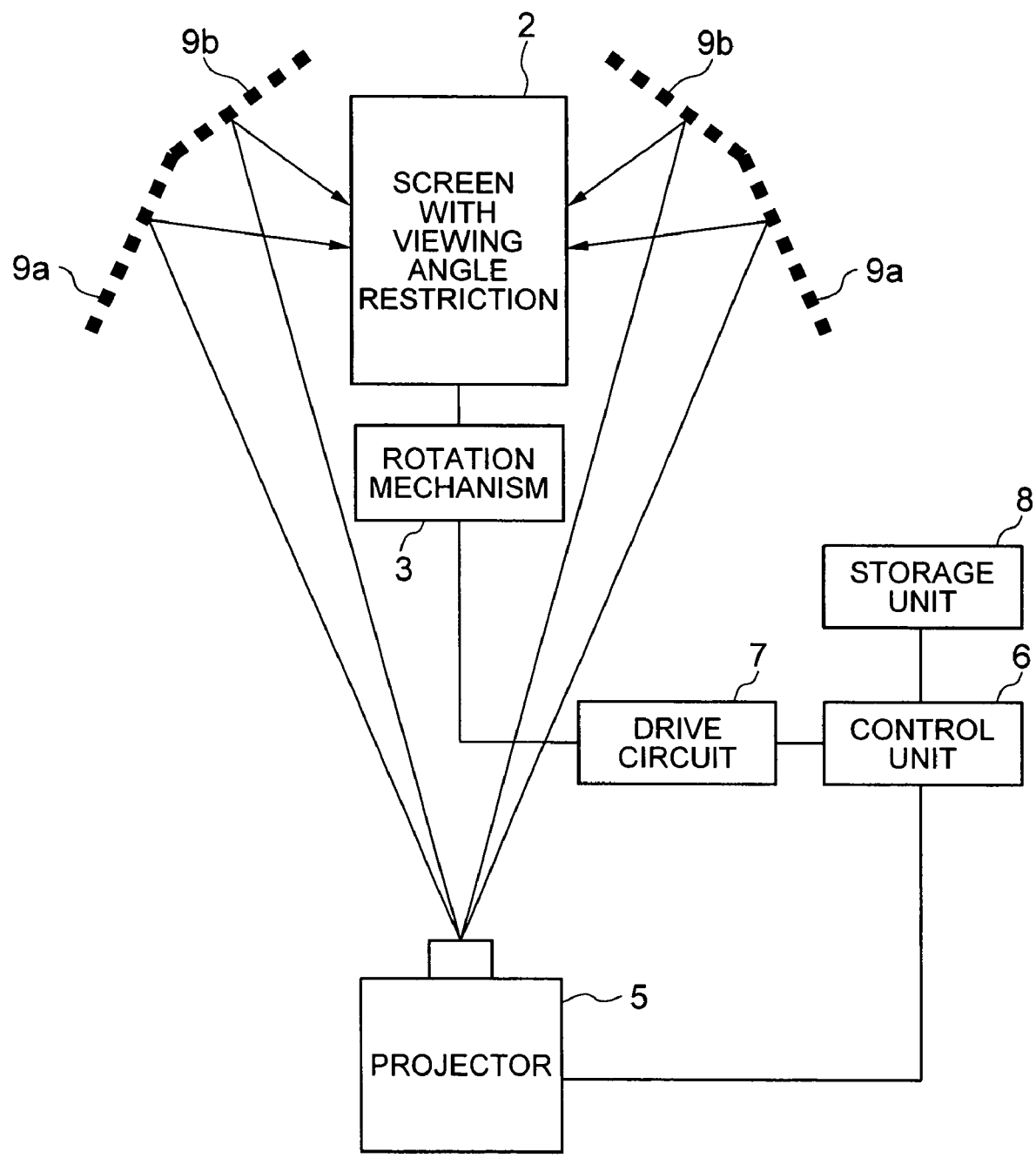
FIG. 29 is a diagram showing a system configuration of a fourth embodiment shown in FIG. 26.

FIG. 29 is a diagram showing a system configuration of the fourth embodiment shown in FIGS. 26 to 28. Components corresponding to those shown in FIGS. 5 and 26 to 28 are denoted by like reference characters, and duplicated description of them will be omitted.

In FIG. 29, video data representing the frame image groups G1 and G2 shown in FIG. 28 are stored in the storage unit 8. The control unit 6 drives the rotation mechanism unit 3 and rotates the screen 2 having viewing angle restriction means by controlling the drive circuit 7. Furthermore, the control unit 6 reads out the video data from the storage unit 8, supplies the video data to the electronic projector 5, and projects the frame image groups G1 and G2 onto the screen 2 having viewing angle restriction means. The video data representing the frame image groups G1 and G2 may be generated arbitrarily by using computer graphics or the like, or may be generated by picking up images with a CCD camera. In the case where images are picked up with a CCD camera to generate the video data, it is also possible to conduct the generation in a remote place, receive the generated video data, and store the video data in the storage unit 8.

Figure 30A:
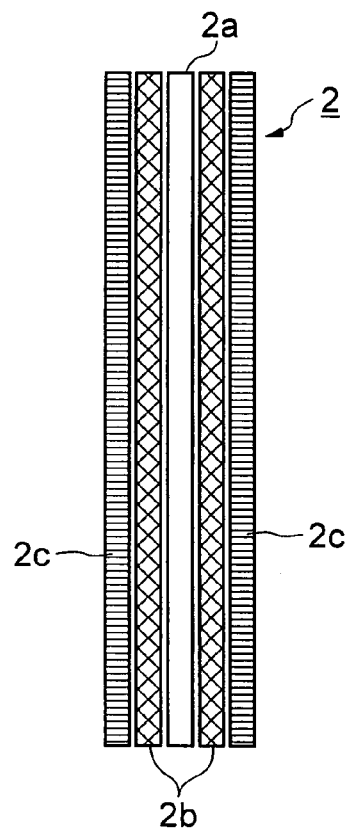
FIGS. 30A–30D are configuration diagrams showing one concrete example of a screen having viewing angle restriction means shown in FIG. 26.

FIGS. 30A–30D are configuration diagrams showing one concrete example of the screen 2 having viewing angle restriction means shown in FIGS. 26, 27 and 29. FIG. 30A is its sectional view. In FIG. 30A, 2a denotes a screen structure, 2b a recursive reflecting mirror, and 2c a diffuse angle restriction filter.

As shown in FIG. 30A, the screen 2 having viewing angle restriction means is formed by stacking the sheet-shaped recursive reflecting mirrors 2b on the screen structure 2a and stacking the sheet-shaped diffuse angle restriction filters 2c on the sheet-shaped recursive reflecting mirrors 2b. Although the recursive reflecting mirror 2b and the diffuse angle restriction filter 2c are stacked on each side of the screen structure 2a, they may be stacked on only one side of the screen structure 2a.

Figure 30B:
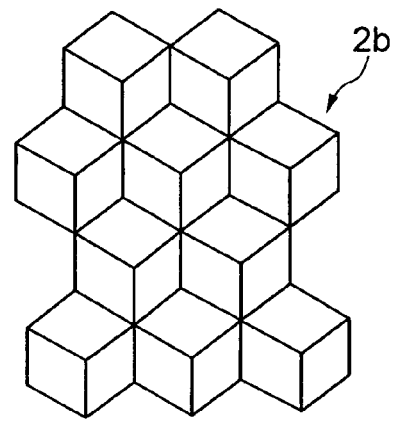

As for the recursive reflecting mirror 2b, cubes are joined at sides as shown in FIG. 30B. In any place, three faces obtained in three cubes by using one face every cube, i.e., three faces including a top face of a lower cube and adjacent side faces of two cubes joined to the lower cube at its two sides constitute one set of reflecting surfaces. These sets of reflecting surfaces constitute the sheet-shaped recursive reflecting mirror 2b. The sheet-shaped recursive reflecting mirrors are used in traffic signs and reflecting plates in safety devices.

Figure 30C:
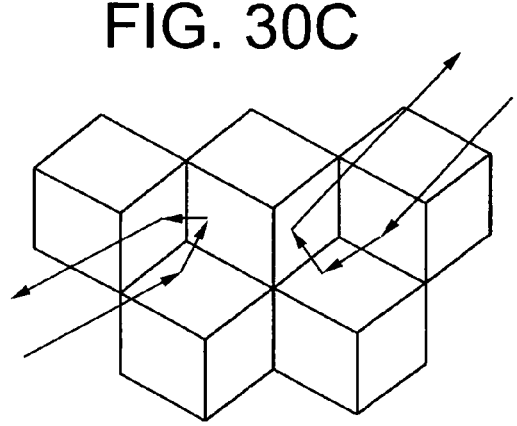

On the recursive reflecting mirror 2b, incident light is reflected by the set of reflecting surfaces as shown in FIG. 30C. If the incident angle is within a certain angle, the incident light is reflected along an incident direction. On the screen 2 having viewing angle restriction means, therefore, each of projection light La and Lb is reflected along its incident direction as described with reference to FIG. 27.

Figure 30D:
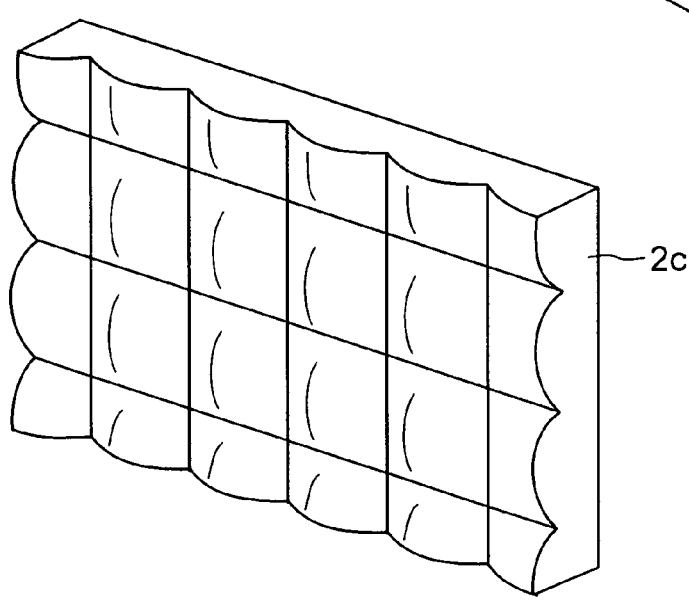

As shown in FIG. 30D, the diffuse angle restriction filter 2c shown in FIG. 30A is an aggregate of very fine lenses, and it is restricted in diffuse angle by curvatures of these lenses.

Figure 31:
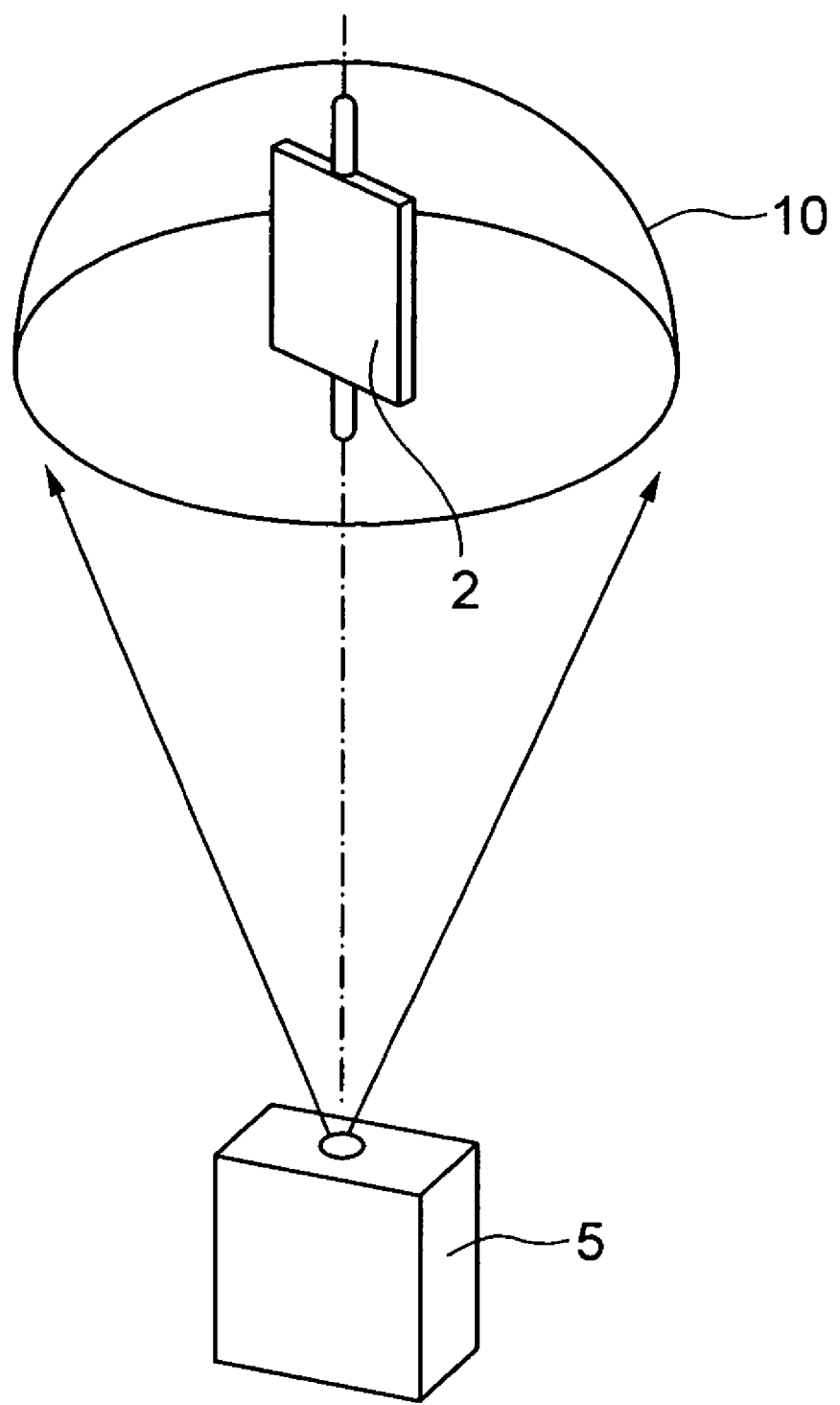
FIG. 31 is a configuration diagram showing a principal part of a fifth embodiment of a stereoscopic display apparatus according to the present invention.

FIG. 31 is a configuration diagram showing a principal part of a fifth embodiment of a stereoscopic display apparatus according to the present invention. Reference numeral 10 denotes a concave half mirror. Components corresponding to those in preceding drawings are denoted by like reference characters, and duplicated description of them will be omitted.

In the fifth embodiment, the concave half mirror 10 taking the shape of a part of a spherical surface or an elliptical surface is disposed as shown in FIG. 31. The electronic projector 5 emits images including two frame image groups of the same substance. These frame image groups are reflected by the concave half mirror 10 and projected onto the screen 2 having viewing angle restriction means.

Figure 32:
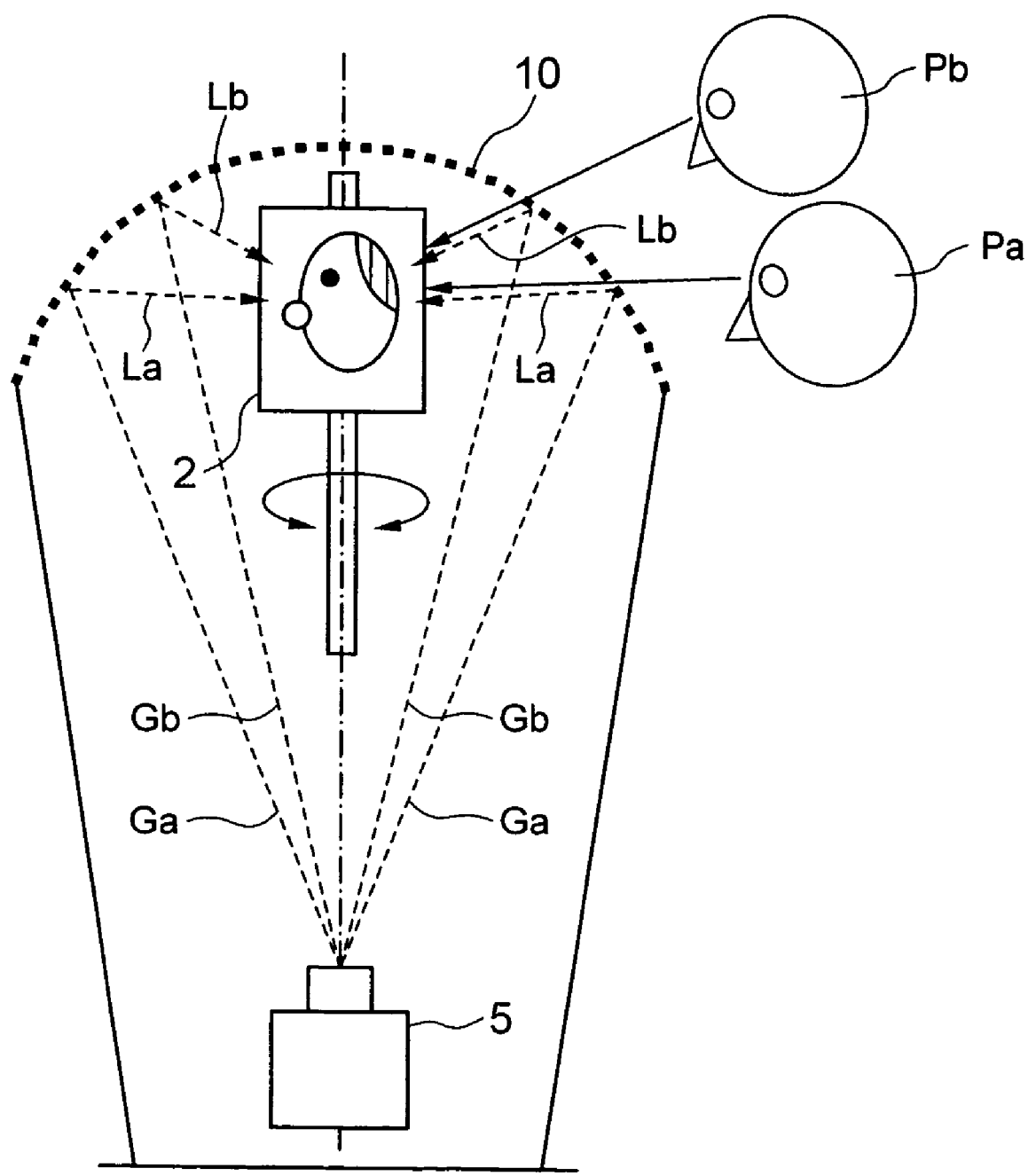
FIG. 32 is a diagram showing a projection state and how a viewer views a frame image in a fifth embodiment shown in FIG. 31.
Figure 33:
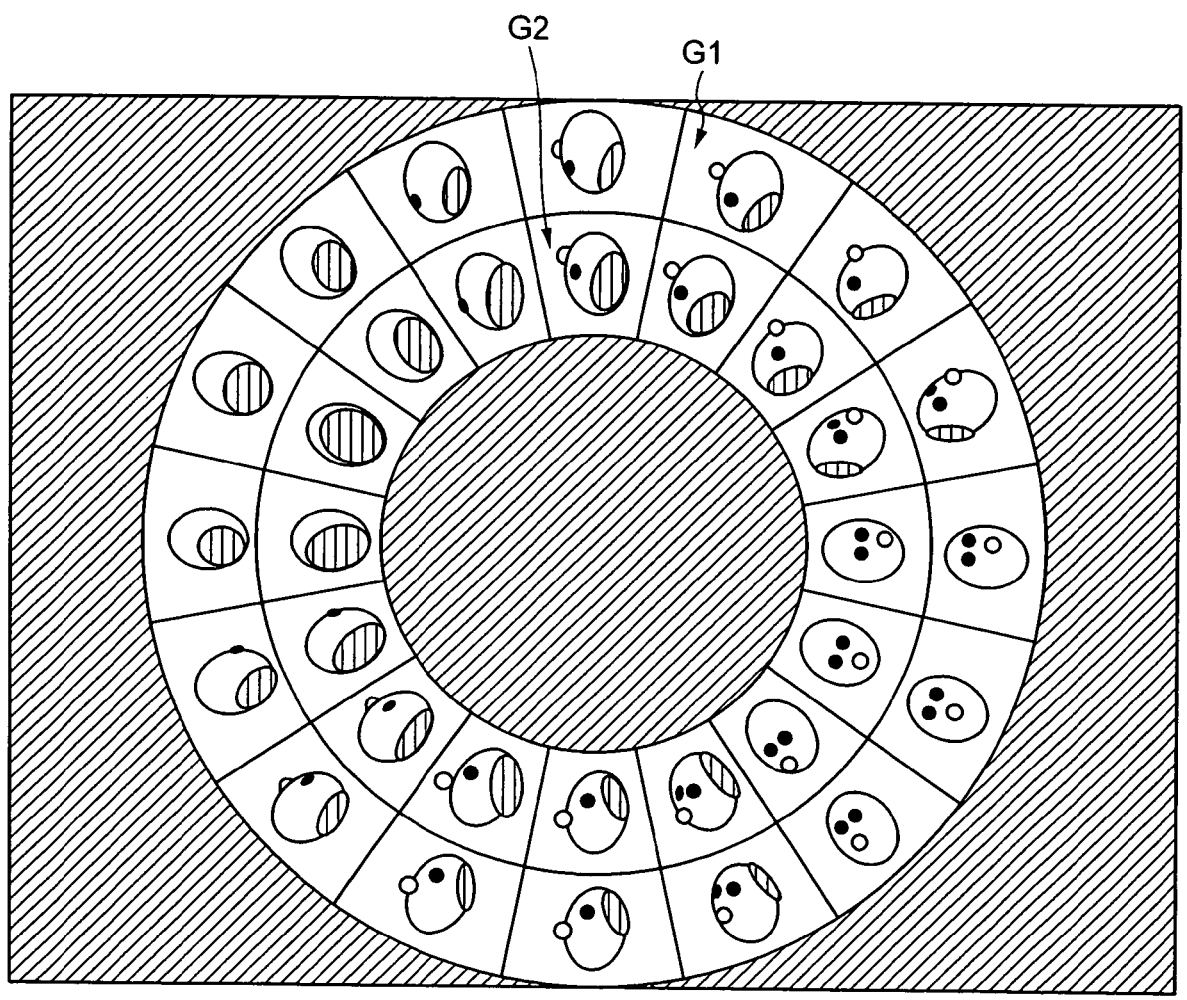
FIG. 33 is a diagram showing frame images emitted from an electronic projector in a fifth embodiment shown in FIG. 31.

FIG. 32 is a diagram showing its projection state and how a viewer views frame images. Images including two frame image groups G1 and G2 are emitted from the electronic projector 5 as shown in FIG. 33. In the same way as images shown in FIG. 28, the frame image group G1 includes images obtained when a substance is viewed from respective directions around the substance. The frame image group G2 includes images obtained when an upper side of the same substance than the frame image group G1 is viewed from respective directions around the substance. The number of frames in the frame image group G1 may be equal to or different from the number of frames in the frame image group G2.

In FIG. 32, the frame images in the frame image group G1 emitted from the electronic projector 5 are reflected by the concave half mirror 10 and projected onto the screen 2 having viewing angle restriction means. The frame images in the frame image group G2 emitted from the electronic projector 5 are also reflected in places different from those associated with the frame image group G1 and projected onto the screen 2 having viewing angle restriction means in nearly the same positions as those for the frame image group G1.

Here, the screen 2 having viewing angle restriction means has the recursive reflecting property described with reference to FIGS. 30A to 30D. As for each of frame images in the frame image group G1 reflected by the concave half mirror and projected onto the screen 2 having viewing angle restriction means, therefore, its projection light La is reflected in its projection direction. As for each of frame images in the frame image group G2 reflected by the concave half mirror 10 and projected onto the screen 2 having viewing angle restriction means, its projection light Lb is also reflected in its projection direction. Therefore, the frame image groups G1 and G2 are viewed through the concave half mirror 10. Only a viewer Pa who views from such a direction that vision nearly coincides with the projection light La of the frame image group G1 can view the frame image group G1 displayed on a plane of the screen 2 having viewing angle restriction means. If a viewer Pb views the screen 2 having viewing angle restriction means through the concave half mirror 10, vision of the viewer Pb deviates largely from the projection light La of the frame image group G1 and consequently the viewer Pb cannot view the frame image group G1. Only a viewer Pb who views from such a direction that vision nearly coincides with the projection light Lb of the frame image group G2 can view the frame image group G2 displayed on a plane of the screen 2 having viewing angle restriction means. If a viewer Pa views the screen 2 having viewing angle restriction means through the concave half mirror 10, vision of the viewer Pa deviates largely from the projection light Lb of the frame image group G2 and consequently the viewer Pa cannot view the frame image group G2.

On the other hand, the viewer Pa can view aspect images around the substance stereoscopically by viewing the frame image group G1 projected on the screen 2 having viewing angle restriction means through the concave half mirror 10. In addition, if the viewer Pa views the screen 2 having viewing angle restriction means from above through the concave half mirror 10, the viewer Pa can stereoscopically view the frame image group G2 as an image of a portion viewed from a higher place as compared with the aspect of the same substance associated with the frame image group G1.

Thus, in the fifth embodiment, aspects around a stereoscopic image in the horizontal direction can be viewed, and in addition, aspects in the vertical direction can also be viewed partially in the same way as the fourth embodiment.

Figure 34:
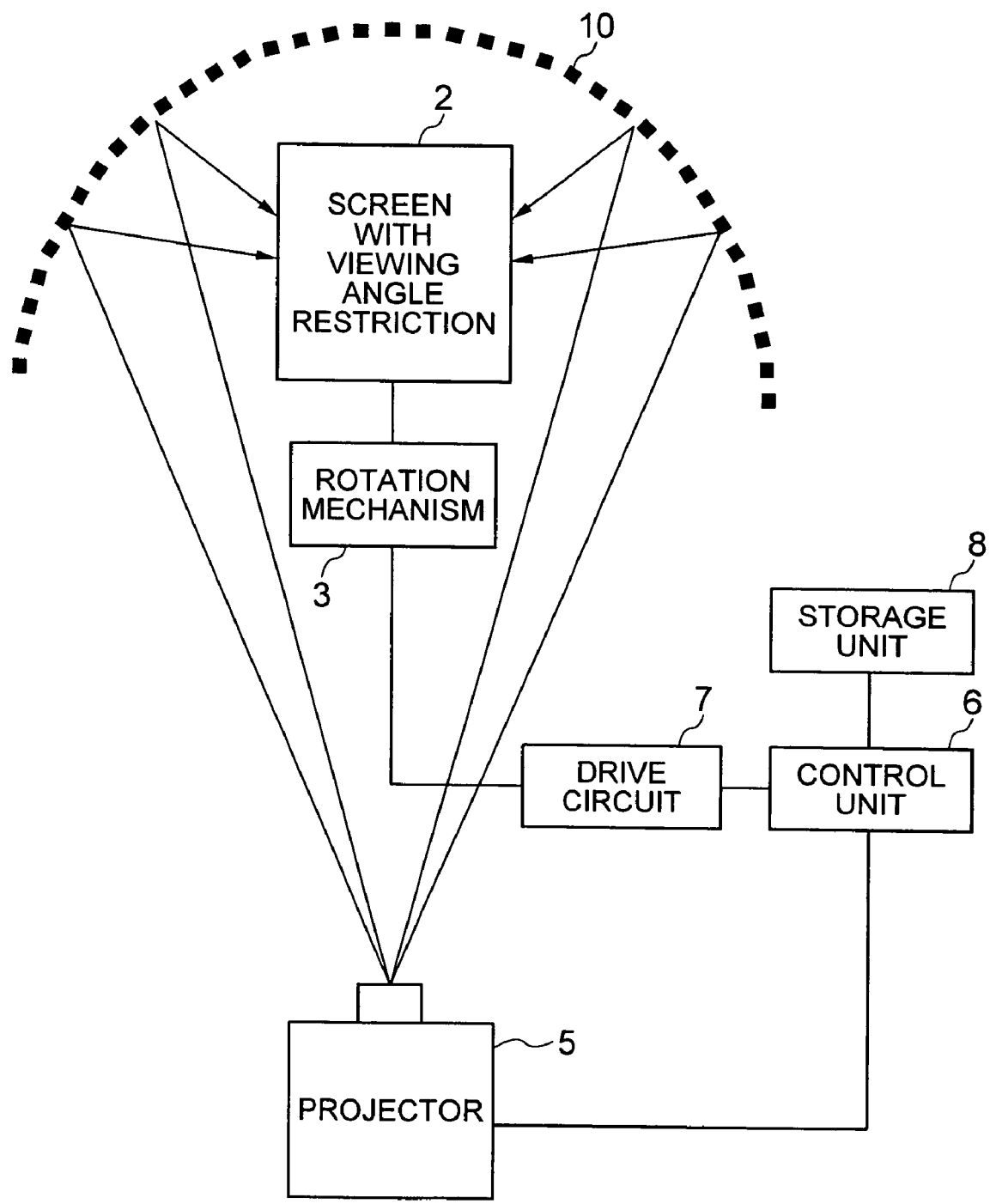
FIG. 34 is a diagram showing a system configuration of a fifth embodiment shown in FIG. 31.

FIG. 34 is a diagram showing a system configuration of the fifth embodiment shown in FIG. 32. Components corresponding to those shown in FIGS. 5, 31 and 32 are denoted by like reference characters.

In FIG. 34, video data representing the frame image groups G1 and G2 shown in FIG. 33 are stored in the storage unit 8. The control unit 6 drives the rotation mechanism unit 3 and rotates the screen 2 having viewing angle restriction means by controlling the drive circuit 7. Furthermore, the control unit 6 reads out the video data from the storage unit 8, supplies the video data to the electronic projector 5, and projects the frame image groups G1 and G2 onto the screen 2 having viewing angle restriction means. The video data representing the frame image groups G1 and G2 may be generated arbitrarily by using computer graphics or the like, or may be generated by picking up images with a CCD camera. In the case where images are picked up with a CCD camera to generate the video data, it is also possible to conduct the generation in a remote place, receive the generated video data, and store the video data in the storage unit 8.

By the way, the projection position of the frame image group G1 on the screen 2 having viewing angle restriction means is squared with the projection position of the frame image group G2 as far as possible. If the shape of the concave half mirror 10 is a part of a spherical surface, therefore, the radius of the spherical surface, a position relation between the screen 2 having viewing angle restriction means and the concave half mirror 10, and a position relation between the concave half mirror 10 and the electronic projector 5 are set so as to satisfy the condition concerning projection positions of the frame image groups G1 and G2.

Figure 35:
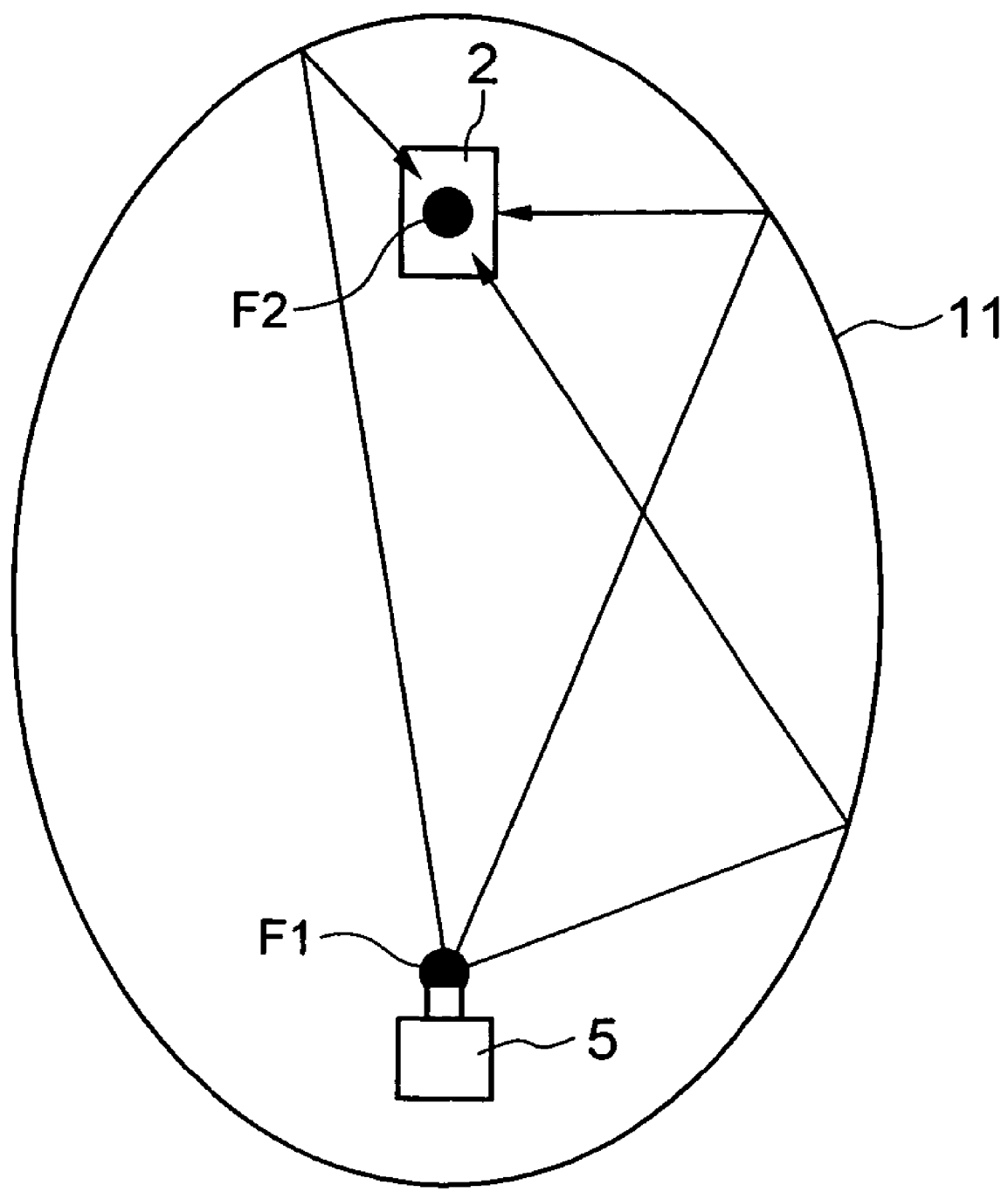
FIG. 35 is a diagram showing a disposition relation between a screen having viewing angle restriction means and an electronic projector in a fifth embodiment shown in FIG. 31.

The shape of the concave half mirror 10 can be made a part of a rotating elliptical surface. As for the reflecting surface formed of a rotating elliptical surface 11 shown in FIG. 35, a projection lens (which focuses the projected frame image groups G1 and G2 onto the screen 2 having viewing angle restriction means) in the electronic projector 5 is positioned in one focus position F1 among two focus positions F1 and F2 of the rotating elliptical surface 11, whereas a center position of a plane of the screen 2 having viewing angle restriction means is positioned in the other focus position F2. Even if the emitted frame image groups G1 and G2 are reflected in different places of the rotating elliptical surface 11, therefore, the frame image groups G1 and G2 are projected into the same place of the plane of the screen 2 having viewing angle restriction means. Therefore, the frame image groups G1 and G2 emitted from the electronic projector 5 can be projected onto the same place of the plane of the screen having viewing angle restriction means, by disposing the projection lens (not illustrated) in the electronic projector 5 in one focus position of the rotating elliptical surface having the concave half mirror 10 as a part thereof in FIG. 32 and disposing the center position of the plane of the screen 2 having viewing angle restriction means in the other focus position.

Thus, in the fifth embodiment as well, aspects around a stereoscopic image in the horizontal direction can be viewed, and in addition, aspects in the vertical direction can also be viewed partially in the same way as the fourth embodiment. Furthermore, as for the concave half mirror 10, it is possible to shape it as one body without combining mirrors unlike the foregoing embodiments.

Comparing the fifth embodiment with the fourth embodiment, the fifth embodiment has a light gathering effect as shown in FIG. 36B unlike the fourth embodiment shown in FIG. 36A. In order to bring the frame image groups G1 and G2 into focus on the screen 2 having viewing angle restriction means, therefore, the focus of the electronic projector 5 is set so as to be slightly distant.

According to the embodiments heretofore described, stereoscopic display apparatuses having the following configurations can be provided.

(1) A stereoscopic display apparatus including:
a rotatable screen having a viewing angle restriction filter;
first and second half mirror groups disposed concentrically around a rotation axis of the screen and respectively on upper and lower sides, each of the first and second half mirror groups including a plurality of half mirrors arranged in a ring form along a circular cone having the rotation axis of the screen as a central axis thereof; and
an electronic projector opposed to surfaces of the half mirrors included in the first and second half mirror groups and disposed in a position to project first and second image groups each including different frame images which represent different aspects of a substance onto the surfaces of the half mirrors in the first and second half mirror groups separately,
wherein the electronic projector is disposed so as to project the frame images onto the half mirrors in the first and second half mirror groups, and
the half mirrors in the first and second mirror groups are disposed on optical paths of an optical system in which the first and second frame image groups projected from the electronic projector are reflected by the surfaces of the half mirrors and projected onto the screen.

(2) A stereoscopic display apparatus described in (1), wherein
the half mirrors in the first half mirror group and the half mirrors in the second half mirror group respectively project frame images in the first frame image group emitted from the electronic projector and frame images in the second frame image group emitted from the electronic projector onto same region on a plane of the screen, and
as the screen rotates, the frame images in the first frame image group projected by the half mirrors in the first half mirror group and the frame images in the second frame image group projected by the half mirrors in the second half mirror group are alternately obtained on the screen.

(3) A stereoscopic display apparatus described in (1) or (2), wherein
the screen has a property of recursive reflection, and
a frame image included in the first frame image group and projected onto the screen can be viewed only through the first half mirror group, and a frame image included in the second frame image group and projected onto the screen can be viewed only through the second half mirror group.

(4) A stereoscopic display apparatus including:
a rotatable screen having a viewing angle restriction filter;
a concave-shaped half mirror having a rotation axis of the screen as a central axis thereof; and
an electronic projector opposed to a surface of the half mirror and disposed in a position to project first and second image groups each including different frame images which represent different aspects of a substance onto the surface of the half mirror, wherein the electronic projector is disposed so as to project the frame images onto the half mirror, and the half mirror is disposed on optical paths of an optical system in which the first and second frame image groups projected from the electronic projector are reflected by the surface of the half mirror and projected onto the screen.

(5) A stereoscopic display apparatus described in (4), wherein the screen has a property of recursive reflection, a frame image included in the first frame image group and projected onto the screen can be viewed through the half mirror from only a direction in which the frame image in the first frame image group is projected onto the screen, and a frame image included in the second frame image group and projected onto the screen can be viewed through the half mirror from only a direction in which the frame image in the second frame image group is projected onto the screen.

(6) A stereoscopic display apparatus described in (4) or (5), wherein the half mirror takes a shape of a part of a rotating elliptical surface, the screen is disposed in one of focus positions of the rotating elliptical surface formed by the half mirror, and the electronic projector is disposed in the other of the focus positions.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stereoscopic display apparatus comprising:
a rotatable screen having a viewing angle restriction filter;
first and second mirror groups disposed concentrically around a rotation axis of said screen, each of said first and second mirror groups comprising a plurality of mirrors arranged in a ring form along a circular cone having the rotation axis of said screen as a central axis thereof; and
an electronic projector opposed to mirror surfaces of the mirrors included in said first and second mirror groups and disposed in a position to project first and second image groups each including different frame images which represent different aspects of a substance onto the mirror surfaces of said first and second mirror groups separately,
wherein said electronic projector is disposed so as to project the frame images onto the mirrors in said first and second mirror groups, and
the mirrors in said first and second mirror groups are disposed on optical paths of an optical system in which the first and second frame image groups projected from said electronic projector are reflected by the mirror surfaces of the mirrors and projected onto said screen.

2. The stereoscopic display apparatus according to claim 1, wherein:
said second mirror group is disposed inside said first mirror group,
the mirrors in said first mirror group project frame images in the first frame image group emitted from said electronic projector onto same first region on a plane of said rotating screen, and
the mirrors in said second mirror group project frame images in the second frame image group emitted from said electronic projector onto same second region on the plane of said rotating screen, the second region being different from the first region.

3. The stereoscopic display apparatus according to claim 1, wherein:
said second mirror group is disposed inside said first mirror group,
the mirrors in said first mirror group and the mirrors in said second mirror group respectively project frame images in the first frame image group emitted from said electronic projector and frame images in the second frame image group emitted from said electronic projector onto same region on a plane of said screen, and
as said screen rotates, the frame images in the first frame image group projected by the mirrors in said first mirror group and the frame images in the second frame image group projected by the mirrors in said second mirror group are alternately obtained on said screen.

4. A stereoscopic display apparatus comprising:
a rotatable screen having a viewing angle restriction filter;
first and second mirror groups disposed concentrically around a rotation axis of said screen, each of said first and second mirror groups comprising a plurality of mirrors arranged in a ring form along a circular cone having the rotation axis of said screen as a central axis thereof;
a first electronic projector opposed to mirror surfaces of the mirrors included in said first mirror group and disposed in a position to project a first image group including different frame images which represent different aspects of a substance onto the mirror surfaces of said first mirror group every frame image; and
a second electronic projector opposed to mirror surfaces of the mirrors included in said second mirror group and disposed in a position to project a second image group including different frame images which represent different aspects of a substance onto the mirror surface of said second mirror group every frame image,
wherein said first mirror group and said second mirror group are disposed respectively over and under said screen separately and so as to have opposed mirror surfaces,
said first and second electronic projectors are disposed respectively over and under said first and second mirror groups separately,
the mirrors in said first mirror group are disposed on optical paths of an optical system in which the first frame image group projected from said first electronic projector is reflected by the mirror surfaces of the mirrors and projected onto said screen, and
the mirrors in said second mirror group are disposed on optical paths of an optical system in which the second frame image group projected from said second electronic projector is reflected by the mirror surfaces of the mirrors and projected onto said screen.

5. The stereoscopic display apparatus according to claim 4, wherein:
the mirrors in said first mirror group project frame images in the first frame image group emitted from said first electronic projector onto same first region on a plane of said rotating screen, and
the mirrors in said second mirror group project frame images in the second frame image group emitted from said second electronic projector onto same second region on the plane of said screen, the second region being different from the first region.

6. The stereoscopic display apparatus according to claim 5, wherein display of frame images in the first frame image group on said screen and display of frame images in the second frame image group on said screen can be switched.

7. The stereoscopic display apparatus according to claim 4, wherein:
the mirrors in said first mirror group and the mirrors in said second mirror group respectively project frame images in the first frame image group emitted from said electronic projector and frame images in the second frame image group emitted from said electronic projector onto same region on a plane of said screen, and
as said screen rotates, the frame images in the first frame image group projected by the mirrors in said first mirror group and the frame images in the second frame image group projected by the mirrors in said second mirror group are alternately obtained on said screen.

8. A stereoscopic display apparatus comprising:
a rotatable screen having a viewing angle restriction filter;
a half mirror group including a plurality of half mirrors arranged in a ring form along a circular cone having the rotation axis of said screen as a central axis thereof; and
an electronic projector opposed to surfaces of the half mirrors included in said half mirror group and disposed in a position to project frame images in a frame image group including different frame images which represent different aspects of a substance onto the surfaces of the separate half mirrors,
wherein said electronic projector is disposed so as to project the frame images included in the frame image group onto respective mirrors in said half mirror group,
the half mirrors are disposed on optical paths of an optical system in which the frame images included in the frame image group projected from said electronic projector are reflected by the surfaces of the half mirrors and projected onto said screen, and
the frame images projected onto said screen can be viewed through said half mirror group.

* * * * *